United States Patent
Nishikawa et al.

(10) Patent No.: US 12,151,981 B2
(45) Date of Patent: Nov. 26, 2024

(54) CERAMIC MATRIX COMPOSITE MANUFACTURING METHOD AND CERAMIC MATRIX COMPOSITE

(71) Applicant: MITSUBISHI HEAVY INDUSTRIES AERO ENGINES, LTD., Aichi (JP)

(72) Inventors: Kosuke Nishikawa, Tokyo (JP); Akira Fukushima, Aichi (JP); Ryoma Nogami, Aichi (JP); Azusa Tamugi, Aichi (JP)

(73) Assignee: MITSUBISHI HEAVY INDUSTRIES AERO ENGINES, LTD., Komaki (JP)

( * ) Notice: Subject to any disclaimer, the term of this patent is extended or adjusted under 35 U.S.C. 154(b) by 435 days.

(21) Appl. No.: 17/442,992

(22) PCT Filed: Feb. 28, 2020

(86) PCT No.: PCT/JP2020/008296
§ 371 (c)(1),
(2) Date: Sep. 24, 2021

(87) PCT Pub. No.: WO2020/195539
PCT Pub. Date: Oct. 1, 2020

(65) Prior Publication Data
US 2022/0185741 A1 Jun. 16, 2022

(30) Foreign Application Priority Data
Mar. 25, 2019 (JP) .................. 2019-057453

(51) Int. Cl.
*C04B 35/64* (2006.01)
*C04B 35/628* (2006.01)
(Continued)

(52) U.S. Cl.
CPC ........ *C04B 35/83* (2013.01); *C04B 35/62852* (2013.01); *C04B 35/62855* (2013.01);
(Continued)

(58) Field of Classification Search
CPC ...................................... C04B 35/80
See application file for complete search history.

(56) References Cited

U.S. PATENT DOCUMENTS

| 5,344,512 A * | 9/1994 | Colomban ............ C04B 35/447 156/314 |
| 6,218,324 B1 * | 4/2001 | Goettler ............ C04B 35/62881 501/88 |

(Continued)

FOREIGN PATENT DOCUMENTS

| EP | 3553042 A1 | 10/2019 |
| JP | S63288974 A | 11/1988 |

(Continued)

OTHER PUBLICATIONS

Extended European Search Report for European Application No. 20778052.9 mailed Feb. 28, 2022; 9pp.
(Continued)

*Primary Examiner* — Erin Snelting
(74) *Attorney, Agent, or Firm* — HAUPTMAN HAM, LLP

(57) ABSTRACT

A ceramic matrix composite manufacturing method includes: forming a zirconia-sol containing layer that contains zirconia sol, on fabric having an interface layer formed on a periphery of each of a plurality of ceramic-made fibers; impregnating the fabric having the zirconia-sol containing layer formed, with a polymer as a precursor, to form a body; supplying oxygen to the polymer included in the body; heating the body in an inert gas atmosphere to cause a reaction of the polymer to form a matrix; and heating the body in an oxygen atmosphere to remove the interface layer, after supplying the oxygen and heating the body in the inert gas atmosphere, to generate a ceramic matrix composite in which the matrix is interposed between the fibers.

11 Claims, 13 Drawing Sheets

(51) Int. Cl.
*C04B 35/80* (2006.01)
*C04B 35/83* (2006.01)

(52) U.S. Cl.
CPC .. *C04B 35/62886* (2013.01); *C04B 35/62892* (2013.01); *C04B 35/62897* (2013.01); *C04B 35/64* (2013.01); *C04B 35/80* (2013.01); C04B 2235/3217 (2013.01); C04B 2235/3244 (2013.01); C04B 2235/422 (2013.01); C04B 2235/5248 (2013.01); C04B 2235/5252 (2013.01); C04B 2235/616 (2013.01); C04B 2235/6583 (2013.01); C04B 2235/661 (2013.01)

(56) References Cited

U.S. PATENT DOCUMENTS

| | | | |
|---|---|---|---|
| 6,251,317 | B1 | 6/2001 | Lundberg et al. |
| 6,528,190 | B1 * | 3/2003 | Campbell ............... C04B 35/80 |
| | | | 428/332 |
| 2019/0225551 | A1 | 7/2019 | Nishikawa et al. |

FOREIGN PATENT DOCUMENTS

| | | | |
|---|---|---|---|
| JP | H04124073 | A | 4/1992 |
| JP | 2018090467 | A | 6/2018 |
| JP | 2018095484 | A | 6/2018 |
| JP | 2020083737 | A | 6/2020 |

OTHER PUBLICATIONS

International Search Report and Written Opinoin of International Application No. PCT/JP2020/008296 mailed Apr. 21, 2020; 8pp.

* cited by examiner

FIG.17

| | FIRST ZIRCONIA CONTENT PERCENTAGE IN ZIRCONIA SOL INTERFACE LAYER [MASS %] | SECOND ZIRCONIA CONTENT PERCENTAGE IN ZIRCONIA-SOL CONTAINING ALUMINA SLURRY LAYER [MASS %] | TENSILE STRENGTH RETENTION RATIO [%] |
|---|---|---|---|
| EXPERIMENT 1 | ABSENT | ABSENT | 59 |
| EXPERIMENT 2 | 5 | ABSENT | 78 |
| EXPERIMENT 3 | ABSENT | 1 | 90 |
| EXPERIMENT 4 | ABSENT | 3 | 64 |
| EXPERIMENT 5 | 5 | 1 | 104 |

CERAMIC MATRIX COMPOSITE MANUFACTURING METHOD AND CERAMIC MATRIX COMPOSITE

RELATED APPLICATIONS

The present application is a National Phase of International Application Number PCT/JP2020/008296 filed Feb. 28, 2020 and claims priority of Japanese Application Number 2019-057453 filed Mar. 25, 2019.

FIELD

The present invention relates to a ceramic matrix composite manufacturing method and a ceramic matrix composite.

BACKGROUND

The use of a ceramic matrix composite (CMC) is being considered for the parts of a body or an engine of an aircraft or the parts of an industrial gas-turbine engine, subjected to a high temperature or with requirements for light-weightiness and high durability. A ceramic matrix composite includes fabric that includes a plurality of fibers, and a reinforcing material, referred to as a matrix, that is filled between the fibers. In order to obtain a ceramic matrix composite, a technique referred to as a polymer impregnation and pyrolysis (PIP) method is used, for example. The PIP method includes a step of impregnating fabric with a precursor of a matrix in a solution containing the precursor, and a step of firing the fabric impregnated with the precursor.

However, if the fabric impregnated with the precursor is fired while the fibers in the fabric are in contact with the precursor, the precursor may cause deteriorations of the fibers, and weaken the strength of the ceramic matrix composite as a finished product. To address this issue, sometimes a carbon interface layer is formed on the periphery of the fibers, and fabric made from such fibers is then impregnated with a precursor and fired, as disclosed in Patent Literature 1, for example. By forming an interface layer on the periphery of the fibers, it is possible to reduce the chances of the fibers being brought into contact with the precursor.

CITATION LIST

Patent Literature

Patent Literature 1: Japanese Patent Application Laid-open No. 2018-095484

SUMMARY

Technical Problem

However, even if fabric having an interface layer on the periphery of the fibers is impregnated with the precursor, and is then fired, the fabric sometimes fails to be fired appropriately depending on the conditions, and the strength reduction of the ceramic matrix composite may not be suppressed. Therefore, there is a demand for suppressing the strength reduction of the ceramic matrix composite. In addition, even in a case where firing can be performed appropriately and the strength reduction of the ceramic matrix composite can be suppressed, if any further thermal exposure is performed, the strength reduction of the ceramic matrix composite may not be suppressed.

The present invention is made to solve the issue described above, and an object of the present invention is to provide a ceramic matrix composite manufacturing method and a ceramic matrix composite capable of suppressing the strength reduction of the ceramic matrix composite.

Solution to Problem

In order to solve the problems described above and achieve the object, a ceramic matrix composite manufacturing method includes: a zirconia-sol containing layer forming step of forming a zirconia-sol containing layer that contains zirconia sol, on fabric having an interface layer formed on a periphery of each of a plurality of ceramic-made fibers; an impregnating step of impregnating the fabric having the zirconia-sol containing layer formed, with a polymer as a precursor, to form a body; an oxygen supplying step of supplying oxygen to the polymer included in the body; an inert-firing step of heating the body in an inert gas atmosphere to cause a reaction of the polymer to form a matrix; and an oxygen-firing step of heating the body in an oxygen atmosphere to remove the interface layer, after the oxygen supplying step and the inert-firing step, to generate a ceramic matrix composite in which the matrix is interposed between the fibers.

With this configuration, it is possible to manufacture a ceramic matrix composite in which a zirconia-containing layer is formed in a vacancy-facing area by a given thickness from a surface of the matrix facing a vacancy, by forming the body that includes the interface layer and the zirconia-sol containing layer, in the order listed herein, from the side of the fiber, between each of the fibers and the polymer in a form of a precursor, by then forming a matrix based on the polymer, and by forming the vacancy based on the interface layer. Therefore, the presence of the vacancy makes it possible to suppress the strength reduction of the ceramic matrix composite, and the presence of the zirconia-containing layer makes it possible to suppress the strength reduction of the ceramic matrix composite under a thermal exposure.

In this configuration, it is preferable that the zirconia-sol containing layer forming step includes a zirconia sol interface layer forming step of forming a zirconia sol interface layer covering a periphery of the interface layer; and an alumina slurry coating step of applying alumina slurry to the fabric having the zirconia sol interface layer formed, to form an alumina slurry coating layer. With this configuration, it is possible to form a zirconia sol interface layer on the side of the vacancy as a zirconia-sol containing layer, and thus, it is possible to form a zirconia-containing layer that is based on the zirconia sol interface layer in the vacancy-facing area. Therefore, it is possible to suppress the strength reduction of the ceramic matrix composite under a thermal exposure, preferably.

In this configuration, it is preferable that the zirconia-sol containing layer forming step includes a zirconia-sol containing alumina slurry coating step of applying alumina slurry that contains the zirconia sol to the fabric, to form an alumina slurry coating layer that contains the zirconia sol. With this configuration, it is possible to form a zirconia-sol containing alumina slurry coating layer as the zirconia-sol containing layer, and thus, it is possible to form a zirconia-containing layer that is based on the zirconia-sol containing alumina slurry coating layer in the vacancy-facing area.

Therefore, it is possible to suppress the strength reduction of the ceramic matrix composite under a thermal exposure, preferably.

In this configuration, it is preferable that the zirconia-sol containing layer forming step includes a zirconia sol interface layer forming step of forming a zirconia sol interface layer that covers a periphery of the interface layer; and a zirconia-sol containing alumina slurry coating step of applying alumina slurry that contains the zirconia sol to the fabric, to form an alumina slurry coating layer that contains the zirconia sol. With this configuration, it is possible to form the zirconia sol interface layer and the zirconia-sol containing alumina slurry coating layer, in the order listed herein from the side of the vacancy, as the zirconia-sol containing layer, and thus, it is possible to form a zirconia-containing layer that is based on the zirconia sol interface layer and the zirconia-sol containing alumina slurry coating layer in the vacancy-facing area. Therefore, it is possible to further suppress the strength reduction of the ceramic matrix composite under a thermal exposure, more preferably.

In these configurations, it is preferable that the inert-firing step is performed after the oxygen supplying step. With this configuration, because the oxygen supplying step is performed first, at the inert-firing step, it is possible to form the matrix by causing a reaction in the oxygen-containing polymer that is the polymer having come to contain oxygen at the oxygen supplying step, in a state with sufficient oxygen supplied to the polymer. Therefore, it is possible to cause the reaction by which the matrix is formed, more preferably.

In these configurations, it is preferable that the oxygen supplying step includes supplying oxygen to the polymer by heating the body in an oxygen atmosphere, and a heating temperature of the body used at the oxygen supplying step is lower than heating temperatures used at the inert-firing step and the oxygen-firing step. With this configuration, because, at the oxygen supplying step, the body is heated at a low temperature in the oxygen atmosphere, it is possible to supply oxygen to the polymer while inhibiting a reaction of the polymer or removal of the interface layer. Therefore, it is possible to suppress the strength reduction of the ceramic matrix composite. It is also preferable that the heating temperature of the body used at the oxygen supplying step is equal to or higher than 200 degrees Celsius and lower than 600 degrees Celsius. With this configuration, because it is possible to supply oxygen to the polymer while inhibiting a reaction of the polymer or a removal of the interface layer, preferably, it is possible to suppress the strength reduction of the ceramic matrix composite, preferably.

In these configurations, it is preferable that the oxygen supplying step includes supplying oxygen to the polymer by keeping the body in a water vapor atmosphere, and a temperature of the water vapor used at the oxygen supplying step is lower than a heating temperature used at the inert-firing step and the oxygen-firing step. With this configuration, because the body is kept in a water vapor atmosphere, it is possible to supply oxygen to the polymer while inhibiting a reaction of the polymer or removal of the interface layer, and therefore, it is possible to suppress the strength reduction of the ceramic matrix composite. It is also preferable that a temperature of the water vapor used at the oxygen supplying step is equal to or higher than 80 degrees Celsius and lower than 200 degrees Celsius. With this configuration, because it is possible to supply oxygen to the polymer while inhibiting a reaction of the polymer or removal of the interface layer, preferably, it is possible to suppress the strength reduction of the ceramic matrix composite, preferably.

In these configurations, it is preferable that the polymer contains a ceramic made of a same material as that of the fibers. With this configuration, by using such a polymer, it is possible to manufacture a ceramic matrix composite, preferably.

In these configurations, it is preferable that the interface layer is a layer including carbon as a main component. With this configuration, by using such an interface layer, it is possible to suppress the fibers from being brought into contact with the polymer, preferably, and to suppress the strength reduction of the ceramic matrix composite.

In order to solve the problems described above and achieve the object, a ceramic matrix composite includes: a plurality of fibers that are made of a ceramic; a matrix that is interposed between the fibers and made from a polymer as a precursor; a vacancy formed between each of the fibers and the matrix; and a zirconia-containing layer that contains zirconia and is formed in a vacancy-facing area from a surface of the matrix facing the vacancy to a given thickness.

With this configuration, the zirconia-containing layer is formed in the vacancy-facing area by a given thickness from a surface of the matrix facing the vacancy. Therefore, the presence of the vacancy makes it possible to achieve a ceramic matrix composite in which the strength reduction is suppressed, and the presence of the zirconia-containing layer makes it possible to achieve a ceramic matrix composite in which the strength reduction under a thermal exposure is suppressed.

In this configuration, it is preferable that, in the zirconia-containing layer, zirconia resides at a high density in the vacancy-facing area. With this configuration, the presence of the zirconia-containing layer makes it possible to achieve a ceramic matrix composite in which the strength reduction under a thermal exposure is suppressed, preferably.

In this configuration, it is preferable that zirconia is dispersed from the vacancy-facing area in the zirconia-containing layer. With this configuration, the presence of the zirconia-containing layer makes it possible to achieve a ceramic matrix composite in which the strength reduction under a thermal exposure is suppressed, preferably.

In this configuration, it is preferable that a part of zirconia resides at a high density in the vacancy-facing area, and another part of remaining zirconia is dispersed from the vacancy-facing area, in the zirconia-containing layer. With this configuration, the presence of the zirconia-containing layer makes it possible to achieve a ceramic matrix composite in which the strength reduction under a thermal exposure is suppressed, more preferably.

Advantageous Effects of Invention

According to the present invention, it is possible to provide a ceramic matrix composite manufacturing method and a ceramic matrix composite capable of suppressing the strength reduction of the ceramic matrix composite.

BRIEF DESCRIPTION OF DRAWINGS

FIG. 17 is a diagram illustrating an example related to the embodiments according to the present invention.

DESCRIPTION OF EMBODIMENTS

A preferred embodiment of the present invention will now be explained in detail with reference to the appended drawings. The embodiment, however, is not intended to limit the scope of the present invention in any way. When the embodiment is included in plurality, any combinations thereof fall within the scope of the present invention.

First Embodiment

Figure 1:
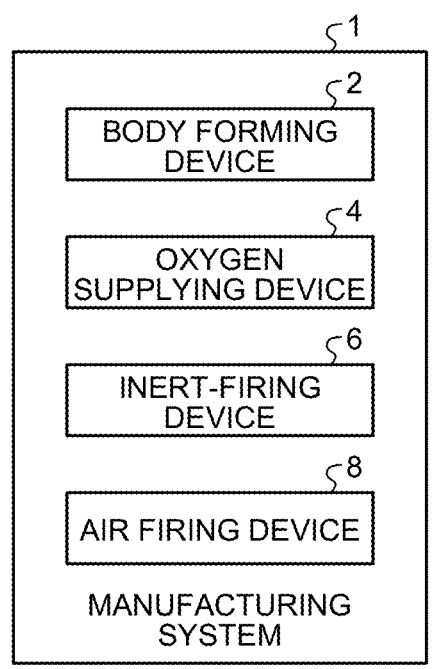
FIG. 1 is a block diagram of a system for manufacturing a ceramic matrix composite according to a first embodiment.

FIG. 1 is a block diagram of a system 1 for manufacturing a ceramic matrix composite according to the first embodiment. The system 1 for manufacturing the ceramic matrix composite according to the first embodiment is a system for manufacturing a ceramic matrix composite 103-1 according to the first embodiment by forming a body 100-1 that is to be the target of the polymer impregnation and pyrolysis (PIP) method, and by applying the PIP method to the formed body 100-1, and is a system for implementing a method for manufacturing the ceramic matrix composite 103-1 according to the first embodiment.

The system 1 for manufacturing the ceramic matrix composite includes, as illustrated in FIG. 1, a body forming device 2, an oxygen supplying device 4, an inert-firing device 6, and an air firing device 8. The body forming device 2 is a device for forming a body 100-1 (see FIGS. 4 to 6, and FIG. 8), which will be described later, by executing a cutting step S10, an interface layer forming step S12, a zirconia-sol containing layer forming step S13, a laminating step S14, and an impregnating step S16 (for all of these steps, see FIG. 2), which will also be described later.

The oxygen supplying device 4 is a device that executes an oxygen supplying step S18 (see FIG. 2), which will be described later, and the inert-firing device 6 is a device that executes an inert-firing step S20 (see FIG. 2) which will be described later. The air firing device 8 is a device that executes an oxygen-firing step S22 (see FIG. 2), which will be described later. The oxygen supplying device 4, the inert-firing device 6, and the air firing device 8 generate a ceramic matrix composite 103-1 (see FIGS. 8 to 10), which is a member made of a ceramic matrix composite (CMC), by applying the processes at the oxygen supplying step S18, the inert-firing step S20, and the oxygen-firing step S22, respectively, to the body 100-1 formed by the body forming device 2. The structures and the like of the body forming device 2, the oxygen supplying device 4, the inert-firing device 6, and the air firing device 8 may be configured in any way, as long as these devices are capable of executing the steps described above.

Figure 2:
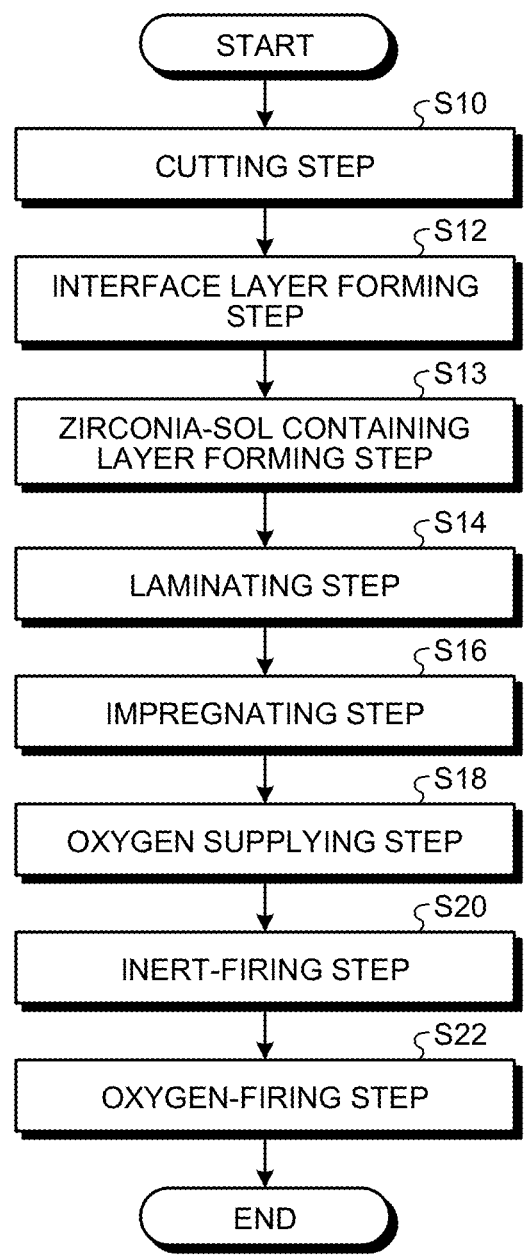
FIG. 2 is a flowchart illustrating a method for manufacturing the ceramic matrix composite according to the first embodiment.

FIG. 2 is a flowchart illustrating the method for manufacturing the ceramic matrix composite 103-1 according to the first embodiment. The method for manufacturing the ceramic matrix composite 103-1 according to the first embodiment performed by the system 1 for manufacturing the ceramic matrix composite is a method for manufacturing the ceramic matrix composite 103-1, and includes, as illustrated in FIG. 2, the cutting step S10, the interface layer forming step S12, the zirconia-sol containing layer forming step S13, the laminating step S14, the impregnating step S16, the oxygen supplying step S18, the inert-firing step S20, and the oxygen-firing step S22.

Figure 3:
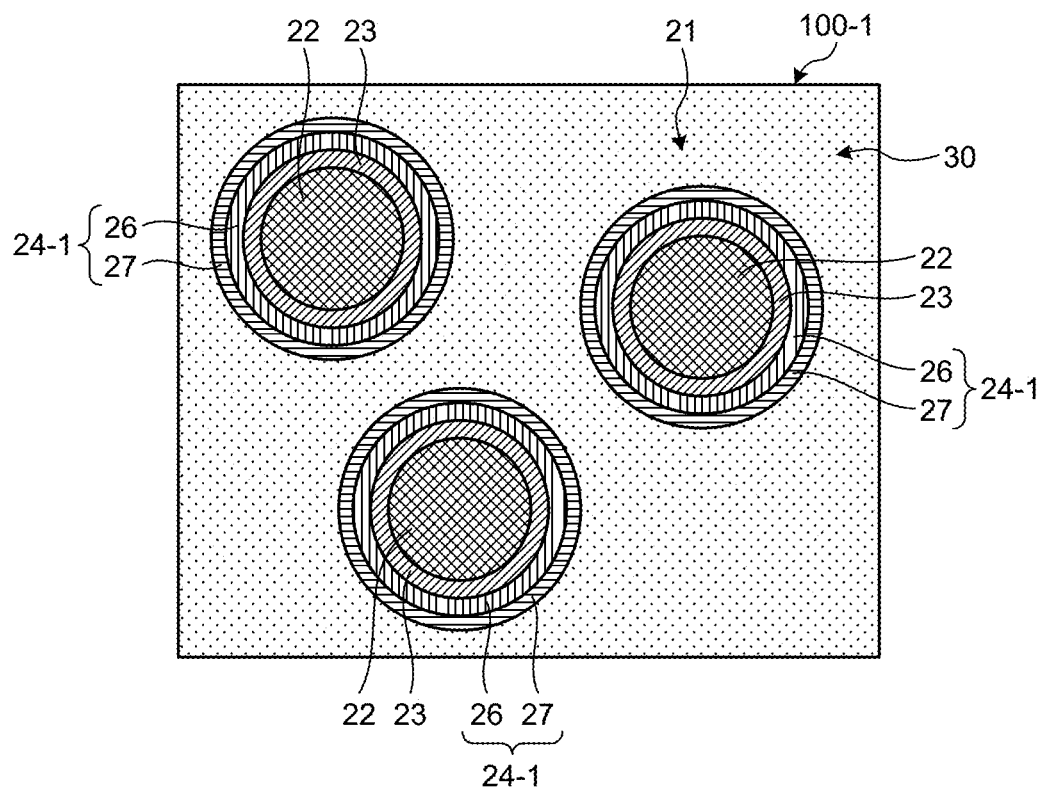
FIG. 3 is an explanatory diagram for explaining the details of a process from a cutting step to an impregnating step according to the first embodiment.
Figure 4:
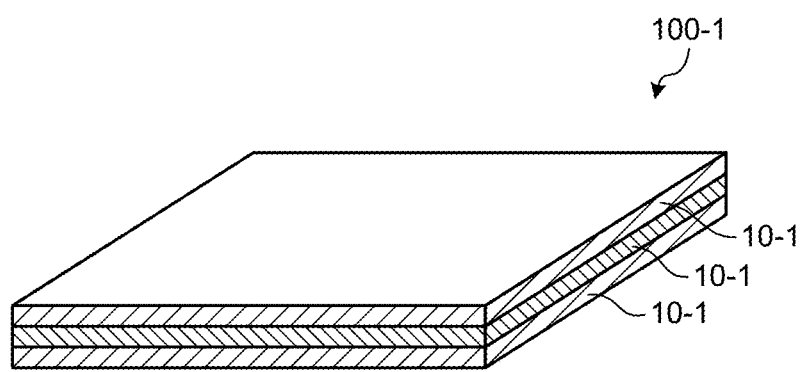
FIG. 4 is an explanatory diagram for explaining the details of a laminating step and an impregnating step according to the first embodiment.
Figure 5:
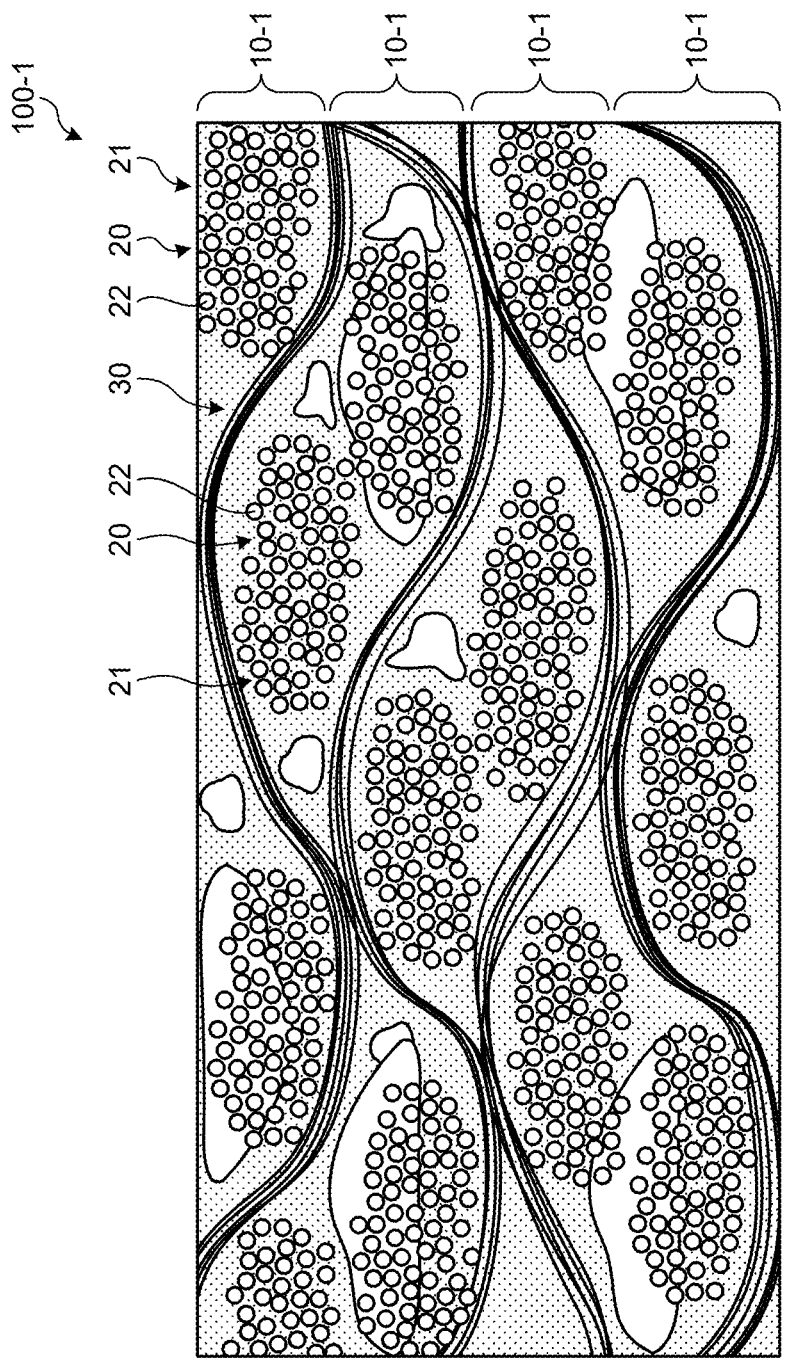
FIG. 5 is another explanatory diagram for explaining the details of the laminating step and the impregnating step according to the first embodiment.
Figure 6:
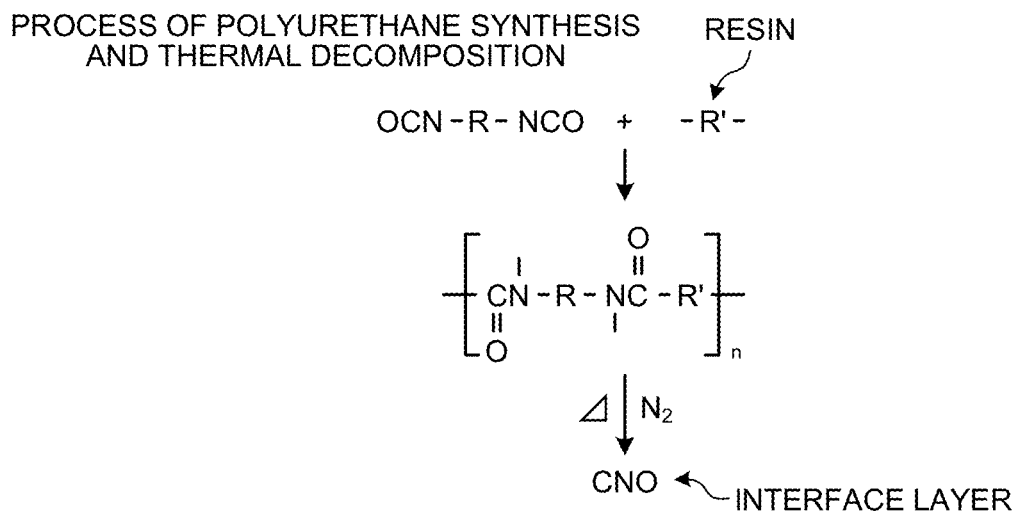
FIG. 6 is an explanatory diagram for explaining the details of an interface layer forming step according to the first embodiment.

FIG. 3 is an explanatory diagram for explaining the details of the process from the cutting step S10 to the impregnating step S16 according to the first embodiment. FIG. 4 is an explanatory diagram for explaining the details of the process from the laminating step S14 and the impregnating step S16 according to the first embodiment. FIG. 5 is another explanatory diagram for explaining the details of the laminating step S14 and the impregnating step S16 according to the first embodiment. FIG. 6 is an explanatory diagram for explaining the details of the interface layer forming step S12 according to the first embodiment. All of FIGS. 3 to 5 illustrate the body 100-1 with which the ceramic matrix composite 103-1 according to the first embodiment is made. The body 100-1 is formed through the process from the cutting step S10 to the impregnating step S16 according to the first embodiment by the body forming device 2. The process from the cutting step S10 to the impregnating step S16 according to the first embodiment will now be explained in detail with reference to FIGS. 3 to 6.

The cutting step S10 is a step of causing the body forming device 2 to cut fabric 20 including a plurality of ceramic-made fibers 22 (see FIG. 5) into a predetermined desired shape and size.

The fabric 20 is woven fabric made from fiber bundles 21, that is, woven fabric made by weaving the fiber bundles 21, as illustrated in FIG. 5. The fabric 20 can be formed by plain-weaving or satin-weaving the fiber bundles 21. The fabric 20 may also be formed as nonwoven fabric using the fiber bundles 21.

Each of the fiber bundle 21 includes a plurality of fibers 22, as illustrated in FIG. 5, and is configured as a bundle of the fibers 22. As the fiber 22, a fiber having a cross-sectional diameter of 10 μm or so is preferably used. The fiber 22 is a fiber containing a ceramic as a main component, that is, a fiber made of a ceramic. Preferably, the fiber 22 contains an oxide ceramic as a main component. Specifically, preferred examples of the oxide ceramic used as the main component of the fiber 22 include alumina ($Al_2O_3$; aluminum oxide) and mullite ($Al_6O_{13}Si_2$; a type of aluminosilicate). The fiber 22 may also be a SiC-based fiber.

The interface layer forming step S12 is a step of causing the body forming device 2 to form an interface layer 23 that covers the periphery of each of the fibers 22, around each of the fibers 22 included in the fiber bundle 21 in the fabric 20 having been cut at the cutting step S10, as illustrated in FIG. 3.

At the interface layer forming step S12, specifically, to begin with, the body forming device 2 allows a given resin to adhere to the periphery of each of the fibers 22. At the interface layer forming step S12, the body forming device 2 then forms the interface layer 23 covering the periphery of each of the fibers 22, by heating the fibers 22 having the given resin adhering to the periphery in an inert gas atmosphere, so that a given chemical reaction of the resin adhering on each of the fibers 22 is induced, and the resin adhering on each of the fibers 22 becomes modified.

As the given resin to be adhering to the periphery of each of the fibers 22 at the interface layer forming step S12, a material (compound) that is different from that of the fibers 22 and a polymer 30 to be described later is used. Specifically, it is preferable for the given resin to include a resin of at least one type selected from a group of polyurethane resin, epoxy resin, polybutadiene, polyethylene glycol, polyolefin resin, vinyl ester resin, saturated polyester resin, unsaturated polyester resin, polyamide resin, polyimide resin, polyamide imide resin, acrylic resin, polypropylene resin, and pitch-based resin. With such a resin, the interface layer 23 can be formed easily by heating the resin of at least one type selected from the group described above in the inert gas atmosphere.

In the first embodiment, nitrogen ($N_2$) is used as the inert gas at the interface layer forming step S12, but the present invention is not limited thereto, and any other known inert gas such as argon (Ar) may be used, for example.

For example, at the interface layer forming step S12, when the body forming device 2 allows a polyurethane polymer compound to adhere to the periphery of each of the fibers 22 as a given resin, and then heats the resultant fibers in the inert gas atmosphere, chemical reactions, including a polyurethane synthesis and a thermal decomposition illustrated in FIG. 6, are induced in the polyurethane polymer compound on the periphery of each of the fibers 22, and CNO that is to serve as the interface layer 23 is formed.

In the first embodiment, at the interface layer forming step S12, the body forming device 2 forms the interface layer 23 by performing an adhesion process of the given resin to the periphery of each of the fibers 22 and heating process of the resultant fibers in the inert gas atmosphere. However, the present invention is not limited thereto, and the interface layer 23 may be formed by performing a direct bonding process which is exemplified by vapor deposition and spattering applied to the periphery of each of the fibers 22.

Figure 7:
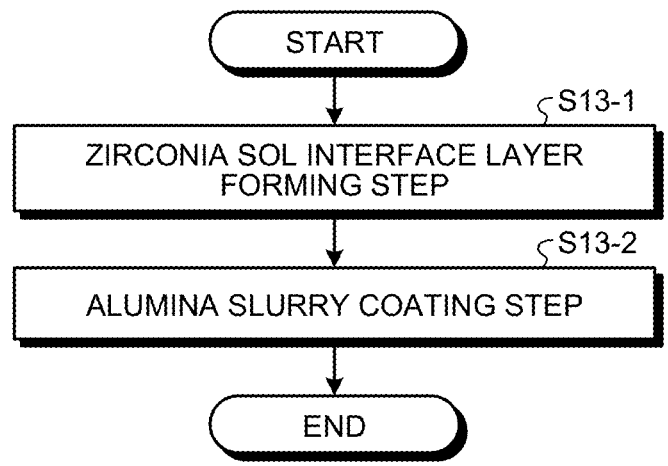
FIG. 7 is a flowchart illustrating the details of a zirconia-sol containing layer forming step according to the first embodiment.

FIG. 7 is a flowchart illustrating the details of the zirconia-sol containing layer forming step S13 according to the first embodiment. The zirconia-sol containing layer forming step S13 in the method for manufacturing the ceramic matrix composite 103-1 according to the first embodiment is a step of forming a zirconia-sol containing layer 24-1 containing zirconia sol, on the fabric 20 in which the interface layer 23 covering the periphery has been formed around the ceramic-made fibers 22 as illustrated in FIG. 3, and includes a zirconia sol interface layer forming step S13-1 and an alumina slurry coating step S13-2 as illustrated in FIG. 7.

The zirconia sol interface layer forming step S13-1 is a step of causing the body forming device 2 to form a zirconia sol interface layer 26 covering the periphery of the interface layer 23, as illustrated in FIG. 3.

At the zirconia sol interface layer forming step S13-1, specifically, the body forming device 2 forms the zirconia sol interface layer 26 by applying a liquid zirconia sol to the periphery of the interface layer 23 to form a zirconia sol coating film around the interface layer 23, placing the fabric 20 in a low pressure such as vacuum so as to promote the impregnation of the zirconia sol coating film into the interface layer 23, and, once the zirconia sol coating film has impregnated into the fiber bundle 21, drying the zirconia sol coating film so as to strip the solvent and the like included in the coating film.

In the first embodiment, the thickness of the zirconia sol interface layer 26 formed at the zirconia sol interface layer forming step S13-1 is equal to or more than 90 nm or equal to or more than 100 nm because zirconia powder to be described later is used as the zirconia powder contained in the zirconia sol. In the first embodiment, the thickness of the zirconia sol interface layer 26 is equal to or smaller than the diameter of the cross section of the fiber 22, specifically, equal to or smaller than 10 μm, and preferably equal to or smaller than one tenth of the diameter of the cross section of the fiber 22, specifically, equal to or smaller than 1 μm.

The zirconia powder included in the zirconia sol used at the zirconia sol interface layer forming step S13-1 is a zirconia powder having a particle diameter equal to or smaller than one tenth or so the diameter of the cross section of the fiber 22. The particle diameter is a powder diameter of the particle approximated as a sphere. That is, in the first embodiment, the zirconia powder having a particle diameter equal to or smaller than 1 μm or so is preferably used. In this case, a fine zirconia sol interface layer 26 can be preferably formed on the periphery of the interface layer 23. Furthermore, as the zirconia powder, powder with a particle diameter of 90 nm or so or a particle diameter of 100 nm or so is used, preferably. However, in the present embodiment, even if the zirconia sol interface layer 26 is not finely formed, it is not a big issue because it is not particularly a problem.

Furthermore, the zirconia sol used at the zirconia sol interface layer forming step S13-1 is preferably a water-based sol, and at a high concentration, that is, a zirconia powder content (hereinafter, referred to as a first zirconia content percentage) where the entire mass of the solute portion of the zirconia sol with solvent, dispersant, and the like excluded as 100% by mass, preferably equal to or more than 1% and equal to or less than 10% by mass, and more preferably equal to or more than 3% and equal to or less than 10% by mass. At the same time, it is more preferable for the zirconia sol to be chlorine-free (not having a chlorine component equal to or more than a given threshold). When these conditions are met, a highly heat-resistant zirconia layer, having the zirconia powder particles highly sintered, can be formed, preferably, as the zirconia sol interface layer 26. Furthermore, water can be used, for example, without any problem as the solvent for the zirconia sol used at the zirconia sol interface layer forming step S13-1.

As illustrated in FIG. 3, the alumina slurry coating step S13-2 is a step of causing the body forming device 2 to form an alumina slurry coating layer 27 that covers the periphery of the zirconia sol interface layer 26 by applying alumina slurry to the fabric 20 having the zirconia sol interface layer 26 formed at the zirconia sol interface layer forming step S13-1, and by applying the same process as that applied to the zirconia coating film to the applied alumina slurry, thereby stripping the solvent and the like contained in the alumina slurry.

In the first embodiment, the thickness of the alumina slurry coating layer 27 formed at the alumina slurry coating step S13-2 is the same as that of the zirconia sol interface layer 26, and is equal to or more than 90 nm or equal to or more than 100 nm. In the first embodiment, the thickness of the alumina slurry coating layer 27 is also equal to or smaller than the diameter of the cross section of the fiber 22, specifically, equal to or smaller than 10 µm, and is preferably equal to or smaller than one tenth or so the diameter of the cross section of the fiber 22, specifically, equal to or smaller than 1 µm.

As the alumina slurry used at the alumina slurry coating step S13-2, any known alumina slurry can be used.

In the manner described above, in the first embodiment, the zirconia-sol containing layer forming step S13 is a step of forming the zirconia-sol containing layer 24-1 including the zirconia sol interface layer 26 and the alumina slurry coating layer 27 that are sequentially layered from the periphery side of the interface layer 23 to the outside by forming the zirconia sol interface layer 26 at the zirconia sol interface layer forming step S13-1, and then forming the alumina slurry coating layer 27 at the alumina slurry coating step S13-2.

The laminating step S14 is a step of causing the body forming device 2 to laminate the fabric 20 formed through the cutting step S10, the interface layer forming step S12, and the zirconia-sol containing layer forming step S13, in a plurality of layers, until a desired thickness is achieved.

At the laminating step S14, the fabric 20 after lamination can be given a quasi-isotropic property by causing the body forming device 2 to change the orientation of the long-axis direction of the fibers 22 every time the body forming device 2 lays a layer of the fabric 20, specifically, to lay the fabric 20 in n layers while changing the orientation of the long-axis direction of the fibers 22 on each layer by (360/n) degrees, for example.

Figure 8:
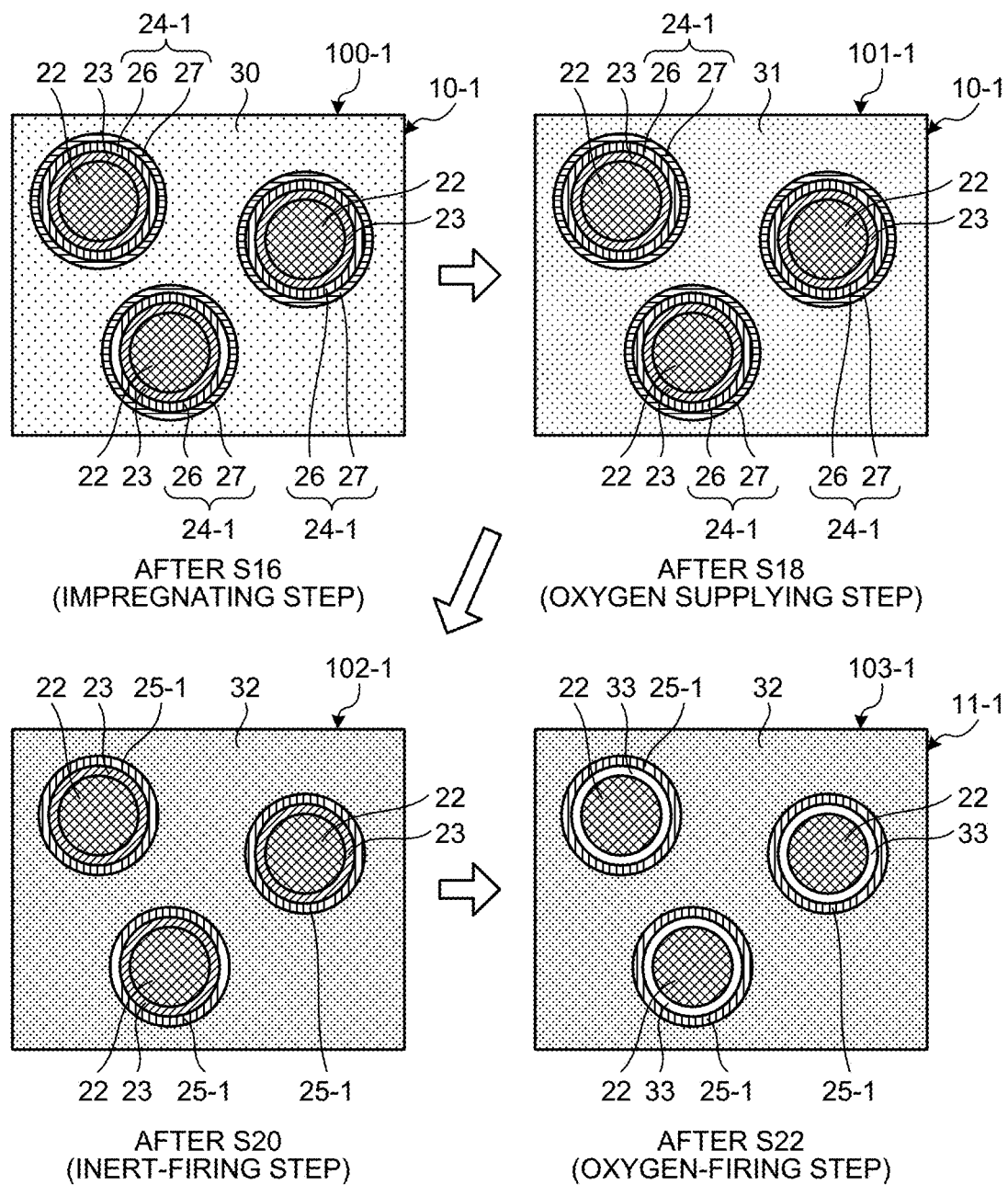
FIG. 8 is an explanatory diagram for explaining the details of a process from an oxygen supplying step to an oxygen-firing step according to the first embodiment.
Figure 10:
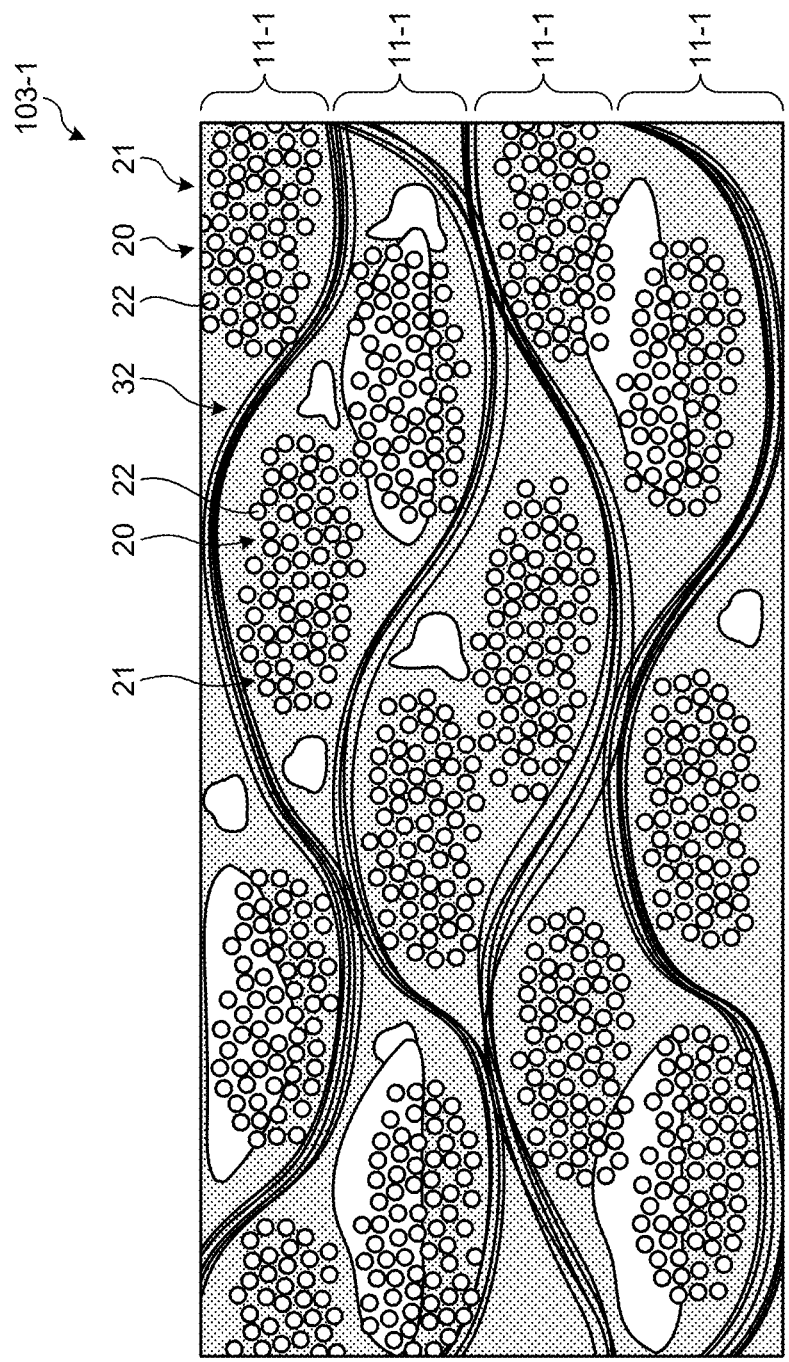
FIG. 10 is a schematic view illustrating a detailed configuration of the ceramic matrix composite according to the first embodiment.

The impregnating step S16 is a step of causing the body forming device 2 to form the body 100-1 by impregnating the fabric 20 including the zirconia-sol containing layer 24-1 formed at the zirconia-sol containing layer forming step S13 with a polymer 30 as a precursor of a matrix 32 (see FIGS. 8 and 10).

At the impregnating step S16, specifically, the body forming device 2 soaks the fabric 20 including the zirconia-sol containing layer 24-1, formed at the zirconia-sol containing layer forming step S13, in fluid slurry of the polymer 30, to let the polymer 30 to fill the space between the fiber bundles 21 or the fibers 22 in the fiber bundles 21 of the fabric 20, via the interface layer 23 and the zirconia-sol containing layer 24-1.

In the manner described above, in the first embodiment, the impregnating step S16 is a process for forming the body 100-1 that is a laminated body of the fiber layers 10-1 including the fabric 20 and the polymer 30, that is, a laminated body of the fiber layers 10-1 in which the fabric 20 is impregnated with the polymer 30 as illustrated in FIGS. 4 and 5 by impregnating the fabric 20 with the polymer 30. More specifically, in the first embodiment, the fiber layers 10-1 include the fabric 20 (the fiber bundles 21 and the fibers 22), the interface layer 23, the zirconia-sol containing layer 24-1 (the zirconia sol interface layer 26 and the alumina slurry coating layer 27), and the polymer 30.

The body 100-1 formed through the process from the cutting step S10 to the impregnating step S16 according to the first embodiment by the body forming device 2 in the manner described above are, for example, formed in a thin plate-like shape resultant of laminating the fiber layers 10-1, as illustrated in FIG. 4. In other words, the body 100-1 has a configuration in which the fiber layers 10-1 are arranged in a manner overlapping one another. In the example illustrated in FIG. 4, the boundaries between the fiber layers 10-1 in the body 100-1 are illustrated for convenience, but in the reality, there are no such clear boundaries between the fiber layers 10-1 as illustrated in FIG. 5, and the fiber layers 10-1 are integrated with one another. Furthermore, the shape of the body 100-1 is not limited to the plate-like shape illustrated in FIG. 4, and may be a shape of various kinds.

The polymer 30 with which the laminated body of the fabric 20 is impregnated at the impregnating step S16 is a precursor of the matrix 32 that is cured by a thermal decomposition at an inert-firing step S20 and an oxygen-firing step S22, which will be described later, to form the matrix 32. Specifically, the polymer 30 with which the laminated body of the fabric 20 is impregnated at the impregnating step S16 is preferably a precursor of an oxide ceramic, and is preferably a precursor of a ceramic that is the same as that of which the fiber 22 is made, that is, a precursor of an oxide ceramic such as alumina or mullite, and more preferably a precursor of an oxide ceramic including metalloxane (M-O bond) such as an Al—O bond or a Si—O bond.

In the first embodiment, the process is performed in an order in which the pieces of the fabric 20 are laminated at the laminating step S14, to be followed by the impregnating step S16 at which the laminated body of the fabric 20 is impregnated with the polymer 30, but the present invention is not limited thereto. The body 100-1 may be formed by performing the impregnating step S16 first to form the fiber layers 10-1, and then performing the laminating step S14 to laminate the fiber layers 10-1.

In the manner described above, each process from the cutting step S10 to the impregnating step S16 makes up a process in which the body forming device 2 forms the body 100-1 based on raw materials such as the fabric 20, the given resin that is to be turned into the interface layer 23, the zirconia sol, the alumina slurry, and the polymer 30 to be included in the zirconia-sol containing layer 24-1. In the first embodiment, each process from the cutting step S10 to the impregnating step S16 is performed by the body forming device 2, but the present invention is not limited thereto, and a part or the whole of the processes described above may be performed manually by a worker, for example.

Each process from the oxygen supplying step S18 to the oxygen-firing step S22, which follows each process from the cutting step S10 to the impregnating step S16, is a process in which the ceramic matrix composite 103-1 is manufactured using the oxygen supplying device 4, the inert-firing device 6, and the air firing device 8, based on the body 100-1 having been formed in the previous processes.

FIG. 8 is an explanatory diagram for explaining the details of the process from the oxygen supplying step S18 to the oxygen-firing step S22 according to the first embodiment. The following explains the details of process from the oxygen supplying step S18 to the oxygen-firing step S22 according to the first embodiment with reference to FIG. 8. The four diagrams included in FIG. 8 are all sectional views of the structure. The upper left diagram in FIG. 8 illustrates the body 100-1 formed through each process from the cutting step S10 to the impregnating step S16. The upper right diagram in FIG. 8 illustrates an oxygen containing body 101-1 as a result of applying the oxygen supplying step S18 to the body 100-1. The lower left diagram in FIG. 8 illustrates an inert-fired body 102-1 as a result of applying the inert-firing step S20 to the oxygen containing body 101-1, and the lower right diagram in FIG. 8 illustrates a ceramic matrix composite 103-1 as a result of applying the oxygen-firing step S22 to the inert-fired body 102-1.

As illustrated in the upper left and the upper right diagrams in FIG. 8, the oxygen supplying step S18 is a step of causing the oxygen supplying device 4 to supply oxygen to the polymer 30 included in the body 100-1, that is, the polymer 30 with which the fabric 20 is impregnated, to cause the polymer 30 to come to contain oxygen or to cause the polymer 30 to be oxidized, so that the polymer 30 is modified to oxygen-containing polymer 31 to acquire the oxygen containing body 101-1.

At the oxygen supplying step S18, because the portion other than the polymer 30 does not go through a chemical reaction, the fabric 20 (the fiber bundle 21 and the fiber 22), the interface layer 23, and the zirconia-sol containing layer 24-1 (the zirconia sol interface layer 26 and the alumina slurry coating layer 27) included in the body 100-1 remain included in the oxygen containing body 101-1 in the original shape and composition.

At the oxygen supplying step S18, specifically, the oxygen supplying device 4 generates an oxygen atmosphere and heats the body 100-1 at a given first temperature in the oxygen atmosphere, thereby supplying oxygen to the polymer 30, so that the polymer 30 is modified to the oxygen-containing polymer 31. The oxygen atmosphere generated at the oxygen supplying step S18 indicates an atmosphere of a gas containing oxygen, and specifically, its preferred examples include an air atmosphere, and an atmosphere of a gas only containing oxygen.

The first temperature that is a heating temperature of the body 100-1 used at the oxygen supplying step S18 is lower than a second temperature that is a heating temperature used at the inert-firing step S20, which will be described later, and is also lower than a third temperature that is a heating temperature used at the oxygen-firing step S22, which will also be described later. The first temperature is a temperature low enough to inhibit the oxidation of the interface layer 23. The first temperature is preferably a temperature high enough to activate the oxidation of the polymer 30. Specifically, the first temperature is preferably equal to or higher than 200 degrees Celsius and lower than 600 degrees Celsius, and more preferably, equal to or higher than 400 degrees Celsius and equal to or lower than 500 degrees Celsius. At the oxygen supplying step S18, by heating the body 100-1 at the first temperature that is relatively low and is lower than the second temperature and the third temperature to be described above, the oxidation of the polymer 30 can be promoted, preferably, while inhibiting the oxidation of the interface layer 23, preferably.

A first heating time that is the time for which the body 100-1 is heated at the oxygen supplying step S18, and is equal to or more than 5 minutes. Preferably, the first heating time is equal to or less than 180 minutes. In the present invention, however, the first heating time at the oxygen supplying step S18 is not limited thereto, and may be changed as appropriate depending on the selected raw materials, the first temperature, the atmosphere environment, and the like. When the oxygen supplying device 4 performs such an oxygen supplying step S18, specifically, in the first embodiment, preferred examples include a heating furnace that carries out heating in the air, an atmosphere heating furnace that carries out heating by generating an atmosphere in the furnace, and the like.

At the oxygen supplying step S18, specifically, the oxygen supplying device 4 may also be configured to generate a water vapor atmosphere at a given temperature, and keep and expose the body 100-1 in and to the water vapor atmosphere at the given temperature for a given time period, to supply oxygen to the polymer 30, so that the polymer 30 is modified to the oxygen-containing polymer 31. At this time, the given temperature of the water vapor atmosphere used at the oxygen supplying step S18 is preferably equal to or higher than 80 degrees Celsius and equal to or lower than 200 degrees Celsius. At the oxygen supplying step S18, by keeping and exposing the body 100-1 in and to the water vapor atmosphere at the given temperature, the oxidation of the polymer 30 can be promoted, preferably, while inhibiting the oxidation of the interface layer 23, preferably.

The given time period for which the body 100-1 is kept in the water vapor atmosphere at the oxygen supplying step S18 is equal to or more than 60 minutes. Furthermore, the given time period used at the oxygen supplying step S18 is preferably equal to or less than 180 minutes. In the present invention, however, the given time period used at the oxygen supplying step S18 is not limited thereto, and may be changed as appropriate depending on the selected raw materials, the first temperature, the atmosphere environment, and the like. When the oxygen supplying device 4 performs such an oxygen supplying step S18, specifically, in the first embodiment, a preferred example includes a vapor exposure device for exposing to the water vapor and the like.

In the present invention, the oxygen supplying device 4 is not limited to the configuration described above, and may be configured any way as long as the device is capable of supplying oxygen to the polymer 30.

The inert-firing step S20 is a step of causing the inert-firing device 6 to obtain the inert-fired body 102-1 by heating the oxygen containing body 101-1, which is the body 100-1 having been processed at the oxygen supplying step S18, in an inert gas atmosphere, so that the oxygen-containing polymer 31, which is the polymer 30 having come to contain oxygen at the oxygen supplying step S18, is heated in the inert gas atmosphere, to cause the oxygen-containing polymer 31 to go through a reaction to form the matrix 32, as illustrated in the upper right diagram and the lower left diagram in FIG. 8.

At the inert-firing step S20, specifically, by causing the inert-firing device 6 to heat the oxygen containing body 101-1 in an inert gas atmosphere at a given second temperature, it is possible to modify the oxygen-containing polymer 31 to the matrix 32, by promoting the oxidation reaction of the oxygen-containing polymer 31, containing oxygen, while inhibiting the oxidation reaction of the interface layer 23, with a suppressed oxygen content, so that the interface layer 23 is maintained. At this time, the inert gas atmosphere generated at the inert-firing step S20 indicates an atmosphere of an inert gas, and preferably a non-oxygen atmosphere, that is, an atmosphere of a gas not containing any oxygen. Specifically, its preferred examples include nitrogen atmosphere, and an atmosphere of a noble gas such as argon.

At the inert-firing step S20, the oxygen-containing polymer 31 goes through a dehydration reaction, so that the hydroxy groups (—OH groups) contained in the oxygen-containing polymer 31 is converted into oxo groups (—O group), and intermolecular condensation is caused to take place between nearby oxo groups. By causing the intramolecular condensation of the oxo groups, the oxygen-containing polymer 31, which originates from the polymer 30 as a precursor, is turned into the matrix 32. At the inert-firing step S20, when the same ceramic precursor as that of the fiber 22 is used for the polymer 30, a solidified body of the same ceramic as that of the fiber 22, that is, a solidified body of the same oxide ceramic such as alumina and mullite is formed as the matrix 32. At the inert-firing step S20, the series of chemical reactions by which the oxygen-containing polymer 31 is modified to the matrix 32 do not need to be completed, and may be carried over to the oxygen-firing step S22, which will be described later.

At the inert-firing step S20, as the heating at the given second temperature takes place with the alumina slurry coating layer 27 in contact with the oxygen-containing polymer 31 that is going through the process of becoming modified and turned into the matrix 32, the alumina slurry coating layer 27 becomes incorporated into the oxygen-containing polymer 31, which is going through a process of being turned into the matrix 32, and merged into the matrix 32. Through the inert-firing step S20, the zirconia sol interface layer 26 becomes mostly sintered. As a result, through the process of the inert-firing step S20, as illustrated in the upper right and the lower left diagrams in FIG. 8, the zirconia sol interface layer 26 in the zirconia-sol containing layer 24-1 is turned into a zirconia-containing layer 25-1 containing sintered zirconia, and the alumina slurry coating layer 27 in the zirconia-sol containing layer 24-1 is merged into the matrix 32.

Because the portion other than the zirconia sol interface layer 26, the alumina slurry coating layer 27, and the oxygen-containing polymer 31 does not go through any chemical reaction at the inert-firing step S20, the fabric 20 (the fiber bundle 21 and the fiber 22) and the interface layer 23 included in the oxygen containing body 101-1 remains included in the inert-fired body 102-1 in the original shape and composition.

The second temperature that is the heating temperature of the oxygen containing body 101-1 used at the inert-firing step S20 is higher than the first temperature, as mentioned above. The second temperature is a temperature high enough to cause the dehydration reaction of the oxygen-containing polymer 31, and is preferably equal to or higher than 800 degrees Celsius and equal to or lower than 1300 degrees Celsius.

At the inert-firing step S20, because the oxygen containing body 101-1 is heated in the inert gas atmosphere at the second temperature, the formation of the matrix 32 can be promoted, preferably, while inhibiting the oxidation of the interface layer 23, preferably. Therefore, at the inert-firing step S20, the interface layer 23 prevents the fibers 22 from being brought into contact with the oxygen-containing polymer 31, which is going through a process of being turned into the matrix 32, so that it is possible to keep the fibers 22 separated from each other.

The second heating time for which the oxygen containing body 101-1 is heated at the inert-firing step S20 is equal to or more than 5 minutes. Preferably, the second heating time is equal to or less than 180 minutes. In the present invention, the second heating time used at the inert-firing step S20 is not limited thereto, and may be changed as appropriate depending on the selected raw materials, the second temperature, the atmosphere environment, and the like. When the inert-firing device 6 performs such an inert-firing step S20, specifically, in the first embodiment, preferred examples include an atmosphere heating furnace that carries out heating by generating an atmosphere in the furnace and the like. When the oxygen supplying device 4 is an atmosphere heating furnace, the same device as the oxygen supplying device 4 may be used for the inert-firing device 6.

In the first embodiment, the process is performed in an order in which oxygen is supplied to the polymer 30 at the oxygen supplying step S18, to be followed by the inert-firing step S20 at which the polymer 30 is modified to the matrix 32, but the present invention is not limited thereto. The polymer 30 in the thermally activated state may be modified to the matrix 32 by thermally activating the polymer 30 at the inert-firing step S20, and then supplying oxygen to the polymer 30 at the oxygen supplying step S18. In this case, too, generation of the matrix 32 can be promoted, preferably, while inhibiting the oxidation of the interface layer 23, preferably.

Furthermore, in the first embodiment, an example in which the impregnating step S16, the oxygen supplying step S18, and the inert-firing step S20 are performed once in the order listed herein is explained, but the present invention is not limited thereto, and the impregnating step S16, the oxygen supplying step S18, and the inert-firing step S20 may be repeated a plurality of number of times. For example, after the first run of the impregnating step S16 and the first run of the oxygen supplying step S18, return the process so as to perform the second run of the impregnating step S16 for impregnating with the polymer 30. Then, the second run of the oxygen supplying step S18 at which oxygen is supplied again to the polymer 30, the first run of the inert-firing step S20 may then be performed once to the entire polymer 30. Furthermore, after the first run of the inert-firing step S20, return the process to the third run of the impregnating step S16 for impregnating with the polymer 30 further, and then again the third run of the oxygen supplying step S18 and the second run of the inert-firing step S20 may be performed. In the manner described above, by repeating the impregnating step S16, the oxygen supplying step S18, and the inert-firing step S20 a plurality of number of times, it is possible to manufacture the ceramic matrix composite 103-1 with a finer matrix 32, as a result of performing the oxygen-firing step S22, which will be described later.

The oxygen-firing step S22 is a step of causing, subsequently to the oxygen supplying step S18 and the inert-firing step S20, the air firing device 8 to heat the inert-fired body 102-1, which is the body 100-1 applied with the processes at the oxygen supplying step S18 and the inert-firing step S20, in an oxygen atmosphere to remove the interface layer 23 and to form a vacancy 33 in the area where the interface layer 23 was formed, to generate the ceramic matrix composite 103-1 in which the matrix 32 is interposed between the fibers 22, as illustrated in the lower left diagram and the lower right diagram in FIG. 8.

At the oxygen-firing step S22, specifically, the air firing device 8 generates an oxygen atmosphere, and heats the inert-fired body 102-1 in the oxygen atmosphere at given third temperature, to remove the interface layer 23 by inducing a decomposition reaction together with the oxidation reaction of the interface layer 23, and to further promote the reaction of the oxygen-containing polymer 31 in the process of being modified to the matrix 32, if such a reaction has not been completed at the inert-firing step S20. At this time, the oxygen atmosphere generated at the oxygen-firing step S22 refers to an atmosphere of a gas containing oxygen, in the same manner as the oxygen atmosphere generated at the oxygen supplying step S18. Specifically, its preferred examples include an air atmosphere, an atmosphere of a gas only containing oxygen, and the like.

The third temperature that is the heating temperature of the inert-fired body 102-1 used at the oxygen-firing step S22 is higher than the first temperature, as mentioned above. The third temperature is a temperature high enough to cause the decomposition reactions of the interface layer 23 and the dehydration reactions of the oxygen-containing polymer 31, and preferably is equal to or higher than 800 degrees Celsius and equal to or lower than 1300 degrees Celsius, in the same manner as the second temperature.

At the oxygen-firing step S22, because the inert-fired body 102-1 is heated in the oxygen atmosphere at the third temperature, as mentioned above, the formation of the matrix 32 can be promoted while promoting the decomposition reaction of the interface layer 23, preferably. Therefore, at the oxygen-firing step S22, it is possible to form a vacancy 33 in the area where the interface layer 23 was formed, at the last process of the method for manufacturing the ceramic matrix composite 103-1 according to the first embodiment. The presence of the vacancy 33 makes it possible to suppress the strength reduction of the ceramic matrix composite 103-1.

Furthermore, because the fabric 20 (the fiber bundle 21 and the fiber 22) included in the inert-fired body 102-1, and the zirconia-containing layer 25-1 do not go through a chemical reaction at the oxygen-firing step S22, the fabric 20 (the fiber bundle 21 and the fiber 22) included in the inert-fired body 102-1 remains included in the ceramic matrix composite 103-1 in the original shape and composition.

Because, at the oxygen-firing step S22, the zirconia-containing layer 25-1 does not go through a chemical reaction, as the vacancy 33 is formed through the oxygen-firing step S22, the zirconia-containing layer 25-1 remains as a layer sitting in the area facing the vacancy, by a given thickness from the surface facing the vacancy 33, in the original shape and composition, in the matrix 32. In other words, the zirconia-containing layer 25-1 is a layer where zirconia resides at a high density in the vacancy-facing area.

In the first embodiment, zirconia based on the zirconia sol component in the zirconia sol interface layer 26 resides at a high density in the vacancy-facing area, but the present invention is not limited thereto, and the zirconia may be dispersed in the matrix 32, widely dispersed across the matrix 32, or completely dispersed across the matrix 32, through the inert-firing step S20 or the oxygen-firing step S22, and thus the boundary between the zirconia-containing layer 25-1 and the zirconia-containing matrix may be obscure. In either case, at least the vacancy-facing area (the area having been facing the interface layer 23 prior to the oxygen-firing step S22) becomes a state that the zirconia-containing layer 25-1 containing zirconia and where the zirconia is dispersed.

In the manner described above, the fiber layer 10-1 making up the body 100-1 through the oxygen supplying step S18, the inert-firing step S20, and the oxygen-firing step S22, is turned into a fiber layer 11-1 including the fabric 20 (the fiber bundle 21 and the fiber 22), the vacancy 33, the zirconia-containing layer 25-1, and the matrix 32, as illustrated in the upper left and the lower right diagrams in FIG. 8. The fiber layer 11-1 is a layer that configures the ceramic matrix composite 103-1 in a laminated state.

The third heating time that is the time for which the inert-fired body 102-1 is heated at the oxygen-firing step S22 is equal to or more than 5 minutes. It is preferable for the third heating time to be equal to or less than 300 minutes. The third heating time used at the oxygen-firing step S22 is, however, not limited thereto, and may be changed as appropriate depending on the selected raw materials, the third temperature, the atmosphere environment, and the like. When the air firing device 8 performs such an oxygen-firing step S22, specifically, in the first embodiment, some preferred examples include the same device as the oxygen supplying device 4, and the same device as the oxygen supplying device 4 may be used.

Figure 9:
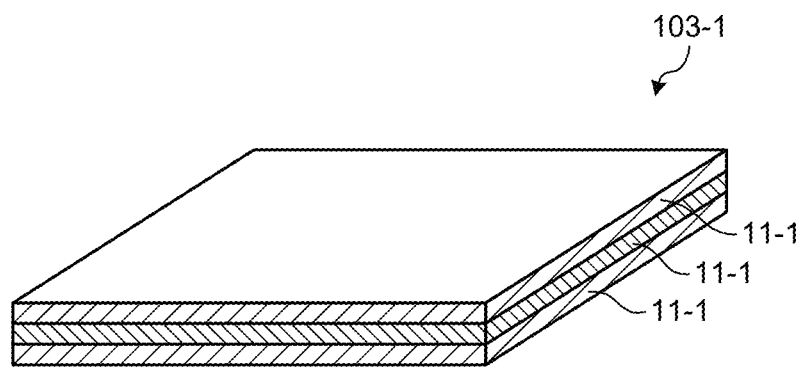
FIG. 9 is a schematic view illustrating a configuration of the ceramic matrix composite according to the first embodiment.

FIG. 9 is a schematic view illustrating a configuration of the ceramic matrix composite 103-1 according to the first embodiment. FIG. 10 is a schematic view illustrating a detailed configuration of the ceramic matrix composite 103-1 according to the first embodiment. The ceramic matrix composite 103-1 according to the first embodiment will now be explained in detail with reference to FIGS. 8, 9, and 10.

As described above, the ceramic matrix composite 103-1, which is formed by performing each process of the process at the oxygen supplying step S18 by the oxygen supplying device 4, the inert-firing step S20 by the inert-firing device 6, and the oxygen-firing step S22 by the air firing device 8 to the body 100-1, is formed in a thin plate-like shape resultant of laminating the fiber layers 11-1, as illustrated in FIG. 9. In other words, the ceramic matrix composite 103-1 has a configuration in which a plurality of the fiber layers 11-1 are arranged in a manner overlapping one another. In the example illustrated in FIG. 9, the boundaries between the fiber layers 11-1 in the ceramic matrix composite 103-1 are illustrated for the convenience. However, in the reality, there are no such clear boundaries between the fiber layers 11-1, as illustrated in FIG. 10, and the fiber layers 11-1 are integrated with one another. Furthermore, the shape of the ceramic matrix composite 103-1 is not limited to a plate-like shape illustrated in FIG. 9, and may be a shape of various kinds.

The ceramic matrix composite 103-1 includes, as illustrated in the lower right diagram in FIG. 8, the fibers 22 that are made of a ceramic, the matrix 32 interposed between the fibers 22 and made from the polymer 30 as a precursor, the vacancy 33 formed between each of the fibers 22 and the matrix 32, and the zirconia-containing layer 25-1 containing zirconia and formed in a vacancy-facing area from a surface of the matrix 32 facing the vacancy 33 to a given thickness. In the zirconia-containing layer 25-1 in the ceramic matrix composite 103-1, zirconia resides at a high density in the vacancy-facing area, as illustrated in the lower right diagram in FIG. 8.

Because the ceramic matrix composite 103-1 has such zirconia-containing layer 25-1, the strength reduction under a thermal exposure is suppressed. The thermal exposure means an exposure to the air at a temperature equal to or higher than 1200 degrees Celsius, and tests are carried out under the condition of being exposed to the air at a temperature of 1200 degrees Celsius for several hours, for example. Furthermore, because the ceramic matrix composite 103-1 has the zirconia-containing layer 25-1 where zirconia resides at a high density in the vacancy-facing area, it is possible to suppress the strength reduction under a thermal exposure, preferably.

The method for manufacturing the ceramic matrix composite 103-1 according to the first embodiment is configured in the manner described above. Therefore, by forming the body 100-1 including the interface layer 23 and the zirconia-sol containing layer 24-1, sequentially from the side of the fiber 22, between the fiber 22 and the polymer 30 as the precursor, and by forming the matrix 32 based on the polymer 30 and forming the vacancy 33 based on the interface layer 23, it is possible to manufacture the ceramic matrix composite 103-1 in which the zirconia-containing layer 25-1 is formed in a vacancy-facing area from a surface of the matrix 32 facing the vacancy 33 to a given thickness. Therefore, in the method for manufacturing the ceramic matrix composite 103-1 according to the first embodiment, the presence of the vacancy 33 makes it possible to suppress the strength reduction of the ceramic matrix composite 103-1, and the presence of the zirconia-containing layer 25-1 makes it possible to suppress the strength reduction of the ceramic matrix composite 103-1 under a thermal exposure. Therefore, the presence of the vacancy 33 makes it possible to suppress the strength reduction of the ceramic matrix composite, and the presence of the zirconia-containing layer 25-1 makes it possible to suppress the strength reduction of the ceramic matrix composite under a thermal exposure.

The ceramic matrix composite 103-1 according to the first embodiment is configured in the manner described above. Therefore, the zirconia-containing layer 25-1 is formed in the vacancy-facing area from a surface of the matrix 32 facing the vacancy 33 to a given thickness. Therefore, the presence of the vacancy 33 in the ceramic matrix composite 103-1 makes it possible to achieve the ceramic matrix composite 103-1 in which the strength reduction is suppressed, and the presence of the zirconia-containing layer 25-1 makes it possible to achieve the ceramic matrix composite 103-1 in which the strength reduction under a thermal exposure is suppressed.

Furthermore, in the method for manufacturing the ceramic matrix composite 103-1 according to the first embodiment, the zirconia-sol containing layer forming step S13 includes the zirconia sol interface layer forming step S13-1 for forming the zirconia sol interface layer 26 covering the periphery of the interface layer 23, the alumina slurry coating step S13-2 for forming the alumina slurry coating layer 27, by applying alumina slurry to the fabric 20 on which the zirconia sol interface layer 26 has been formed. Therefore, with the method for manufacturing the ceramic matrix composite 103-1 according to the first embodiment, it is possible to form the zirconia sol interface layer 26 as the zirconia-sol containing layer 24-1, on the side of the interface layer 23. As a result, the zirconia-containing layer 25-1 based on the zirconia-sol containing layer 24-1 can be formed in the vacancy-facing area, and therefore, the strength reduction of the ceramic matrix composite 103-1 under a thermal exposure can be suppressed, preferably.

Furthermore, the ceramic matrix composite 103-1 according to the first embodiment has the zirconia-containing layer 25-1 where zirconia resides at a high density in the vacancy-facing area. Therefore, the ceramic matrix composite 103-1 according to the first embodiment becomes the ceramic matrix composite 103-1 in which the strength reduction under a thermal exposure is suppressed by the presence of the zirconia-containing layer 25-1, preferably.

In the method for manufacturing the ceramic matrix composite 103-1 according to the first embodiment, the inert-firing step S20 is preferably performed subsequently to the oxygen supplying step S18. Therefore, in the method for manufacturing the ceramic matrix composite 103-1 according to the first embodiment, because the oxygen supplying step S18 is performed first, it is possible to form the matrix 32 with sufficient oxygen supplied to the polymer 30 at the inert-firing step S20 by causing a reaction in the oxygen-containing polymer 31 that is the polymer 30 having come to contain oxygen at the oxygen supplying step S18. Therefore, it is possible to cause the reaction for forming the matrix 32 in a more preferable manner.

Furthermore, in the method for manufacturing the ceramic matrix composite 103-1 according to the first embodiment, it is preferable for the oxygen to be supplied to the polymer 30 by heating the body 100-1 in an oxygen atmosphere at the oxygen supplying step S18, and it is preferable for the first temperature that is the heating temperature of the body 100-1 used at the oxygen supplying step S18 to be lower than the second temperature and the third temperature that are the heating temperatures used at the inert-firing step S20 and the oxygen-firing step S22, respectively. In other words, in the method for manufacturing the ceramic matrix composite 103-1 according to the first embodiment, the body 100-1 is heated in the oxygen atmosphere at a lower temperature at the oxygen supplying step S18. Therefore, oxygen can be supplied to the polymer 30 while inhibiting a reaction of the polymer 30 or removal of the interface layer 23, it is possible to suppress the strength reduction of the ceramic matrix composite 103-1. Furthermore, in the method for manufacturing the ceramic matrix composite 103-1 according to the first embodiment, the heating temperature of the body 100-1 used at the oxygen supplying step S18 is preferably equal to or higher than 200 degrees Celsius and lower than 600 degrees Celsius. Therefore, in the method for manufacturing the ceramic matrix composite 103-1 according to the first embodiment, because oxygen can be supplied to the polymer 30 while inhibiting a reaction of the polymer 30 or removal of the interface layer 23, preferably, it is possible to suppress the strength reduction of the ceramic matrix composite 103-1, preferably.

Furthermore, in the method for manufacturing the ceramic matrix composite 103-1 according to the first embodiment, at the oxygen supplying step S18, the oxygen is supplied to the polymer 30 by keeping the body 100-1 in a water vapor atmosphere, and it is preferable for the temperature of the water vapor used at the oxygen supplying step S18 to be lower than the heating temperatures used at the inert-firing step S20 and the oxygen-firing step S22. Therefore, in the method for manufacturing the ceramic matrix composite 103-1 according to the first embodiment, because the body 100-1 is kept in the water vapor atmosphere, oxygen can be supplied to the polymer 30 while inhibiting a reaction of the polymer 30 or removal of the interface layer 23. Therefore, it is possible to suppress the strength reduction of the ceramic matrix composite 103-1. Furthermore, in the method for manufacturing the ceramic matrix composite 103-1 according to the first embodiment, at the oxygen supplying step S18, it is preferable for the temperature of the water vapor to be equal to or higher than 80 degrees Celsius and lower than 200 degrees Celsius. Therefore, in the method for manufacturing the ceramic matrix composite 103-1 according to the first embodiment, because oxygen can be supplied to the polymer 30 while inhibiting a reaction of the polymer 30 or removal of the interface layer 23, preferably, it is possible to suppress the strength reduction of the ceramic matrix composite 103-1, preferably.

Furthermore, in the method for manufacturing the ceramic matrix composite 103-1 according to the first embodiment, it is preferable for the polymer 30 to include a ceramic made of a material that is the same as that of the fiber 22. Therefore, in the method for manufacturing the ceramic matrix composite 103-1 according to the first embodiment, the ceramic matrix composite 103-1 can be manufactured using such a polymer 30, preferably.

Furthermore, in the method for manufacturing the ceramic matrix composite 103-1 according to the first embodiment, it is preferable for the interface layer 23 to be a layer including carbon as a main component.

Therefore, in the method for manufacturing the ceramic matrix composite 103-1 according to the first embodiment, by using such an interface layer 23, it is possible to suppress the strength reduction of the ceramic matrix composite 103-1 while suppressing the contact between the fiber 22 and the polymer 30, preferably.

Second Embodiment

Figure 11:
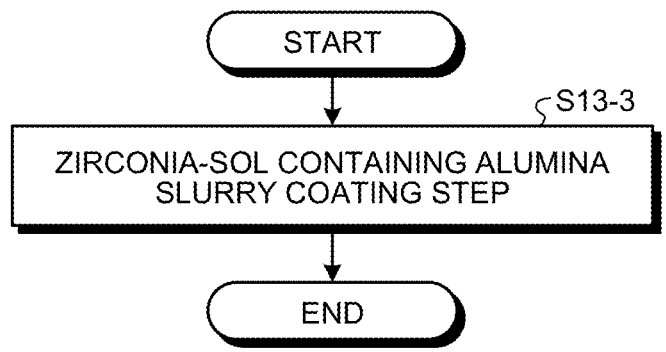
FIG. 11 is a flowchart illustrating the details of a zirconia-sol containing layer forming step according to a second embodiment.

FIG. 11 is a flowchart illustrating the details of the zirconia-sol containing layer forming step S13 according to a second embodiment. The method for manufacturing the ceramic matrix composite 103-2 according to the second embodiment is a modification of the zirconia-sol containing layer forming step S13 in the method for manufacturing the ceramic matrix composite 103-1 according to the second embodiment. The other configurations of the method for manufacturing the ceramic matrix composite 103-2 according to the second embodiment are the same as those in the method for manufacturing the ceramic matrix composite 103-1 according to the first embodiment. In the explanations of the method for manufacturing the ceramic matrix composite 103-2 and the ceramic matrix composite 103-2 according to the second embodiment, the configurations that are the same those in the method for manufacturing the ceramic matrix composite 103-1 and the ceramic matrix composite 103-1 according to the first embodiment are given the same reference signs as those in the first embodiment, and detailed explanations thereof will be omitted.

Figure 12:
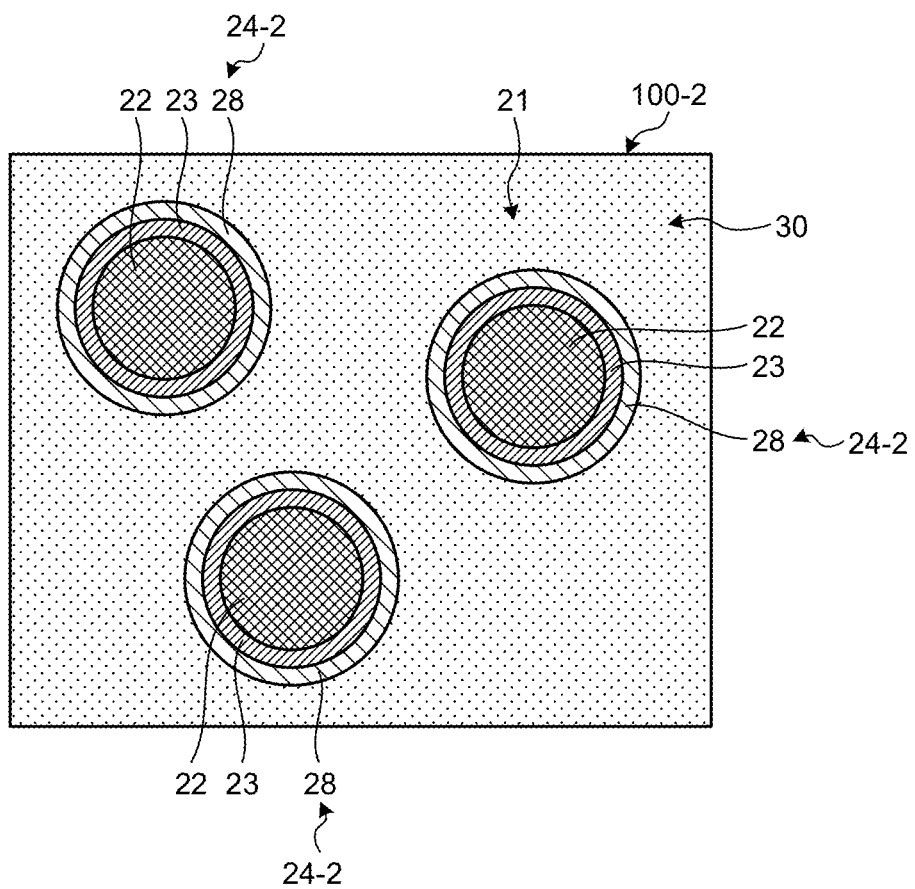
FIG. 12 is an explanatory diagram for explaining the details of a process from a cutting step to an impregnating step according to the second embodiment.

FIG. 12 is an explanatory diagram for explaining the details of a process from the cutting step S10 to the impregnating step S16 according to the second embodiment. FIG. 12 illustrates a body 100-2 from which a ceramic matrix composite 103-2 according to the second embodiment is made. The body 100-2 is formed through the process from the cutting step S10 to the impregnating step S16 according to the second embodiment, performed by the body forming device 2. The following explains the details of process from the cutting step S10 to the impregnating step S16 according to the second embodiment with reference to FIGS. 11 and 12.

As illustrated in FIG. 11, the zirconia-sol containing layer forming step S13 according to the second embodiment is a step of forming a zirconia-sol containing layer 24-2 containing zirconia sol, on the periphery of the ceramic-made fibers 22 included in the fabric 20, in which the interface layer 23 covering the periphery has been formed, as illustrated in FIG. 12, and includes a zirconia-sol containing alumina slurry coating step S13-3.

As illustrated in FIG. 12, the zirconia-sol containing alumina slurry coating step S13-3 is a step of causing the body forming device 2 to form a zirconia-sol containing alumina slurry coating layer 28 that is an alumina slurry coating layer containing zirconia sol, by applying alumina slurry containing zirconia sol, to the fabric 20 having the interface layer 23 formed at the interface layer forming step S12.

In other words, the zirconia-sol containing layer forming step S13 according to the second embodiment is a step of performing the zirconia-sol containing alumina slurry coating step S13-3, instead of the zirconia sol interface layer forming step S13-1 and the alumina slurry coating step S13-2 included in the zirconia-sol containing layer forming step S13 according to the first embodiment, and is a step of forming the zirconia-sol containing layer 24-2 including the zirconia-sol containing alumina slurry coating layer 28, instead of the zirconia-sol containing layer 24-1 including the zirconia sol interface layer 26 and the alumina slurry coating layer 27 according to the first embodiment.

Therefore, in the body 100-1 according to the first embodiment, the body 100-2 according to the second embodiment is modified such that the zirconia-sol containing layer 24-1 including the zirconia sol interface layer 26 and the alumina slurry coating layer 27 is replaced with the zirconia-sol containing layer 24-2 including the zirconia-sol containing alumina slurry coating layer 28.

In the second embodiment, the thickness of the zirconia-sol containing alumina slurry coating layer 28 formed at the zirconia-sol containing alumina slurry coating step S13-3 is a thickness that is the same as that of the zirconia sol interface layer 26 and the alumina slurry coating layer 27 according to the first embodiment, and is equal to or more than 90 nm or equal to or more than 100 nm. In the second embodiment, it is preferable for the thickness of the zirconia-sol containing alumina slurry coating layer 28 to be equal to or less than the diameter of the cross section of the fiber 22, specifically, equal to or smaller than 10 μm, and to be equal to or smaller than one tenth or so the diameter of the cross section of the fiber 22, specifically, equal to or smaller than 1 μm.

The zirconia sol used at the zirconia-sol containing alumina slurry coating step S13-3 is preferably the same as the zirconia sol used at the zirconia sol interface layer forming step S13-1 in the first embodiment. The alumina slurry used at the zirconia-sol containing alumina slurry coating step S13-3 is preferably the same as the alumina slurry used at the alumina slurry coating step S13-2 in the first embodiment. Furthermore, as to the zirconia-sol containing alumina slurry used at the zirconia-sol containing alumina slurry coating step S13-3, representing the entire mass of a solute portion of the alumina slurry, with the solvent, the dispersant, and the like excluded as 100% by mass, the zirconia powder content (hereinafter, referred to as a second zirconia content percentage) of the zirconia-sol containing alumina slurry is preferably equal to or more than 0.01% equal to or less than 5% by mass, and is more preferably equal to or more than 0.1% equal to or less than 3% by mass. Furthermore, as the zirconia-sol containing alumina slurry used at the zirconia-sol containing alumina slurry coating step S13-3, an aqueous dispersion type is preferably used.

Figure 13:
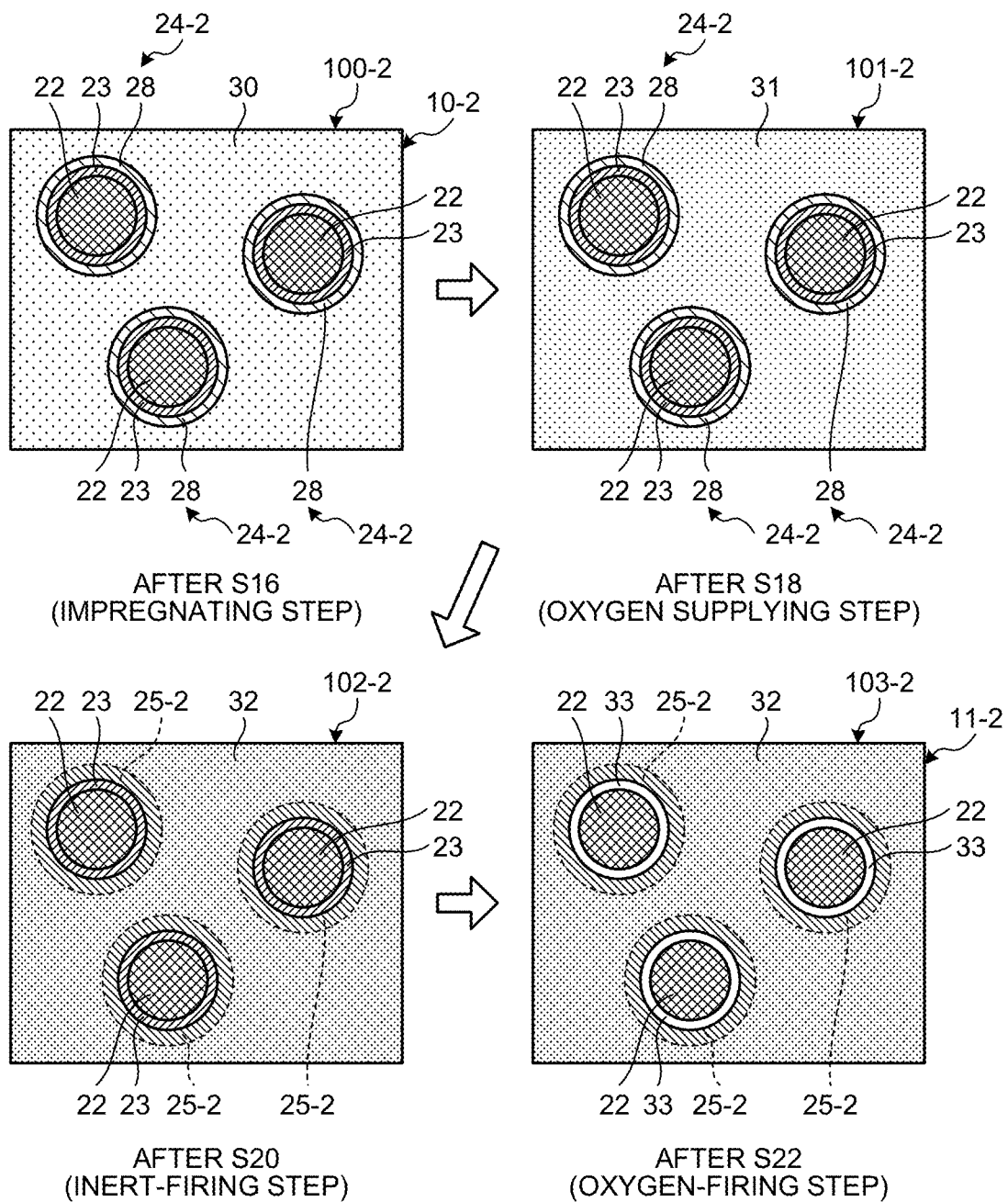
FIG. 13 is an explanatory diagram for explaining the details of a process from an oxygen supplying step to an oxygen-firing step according to the second embodiment.

FIG. 13 is an explanatory diagram for explaining the details of a process from the oxygen supplying step S18 to the oxygen-firing step S22 according to the second embodiment. The following explains the details of process from the oxygen supplying step S18 to the oxygen-firing step S22 according to the second embodiment with reference to FIG. 13. The four diagrams included in FIG. 13 are all sectional views of the structure. The upper left diagram in FIG. 13 illustrates the body 100-2, which is a laminated body of the fiber layers 10-2 including the fabric 20 and the polymer 30, formed through each process from the cutting step S10 to the impregnating step S16 as in the first embodiment. The upper right diagram in FIG. 13 illustrates an oxygen containing body 101-2 as a result of applying the oxygen supplying step S18 to the body 100-2. The lower left diagram in FIG. 13 illustrates an inert-fired body 102-2 as a result of applying the inert-firing step S20 to the oxygen containing body 101-2, and the lower right diagram in FIG. 13 illustrates a ceramic matrix composite 103-2 as a result of applying the oxygen-firing step S22 to the inert-fired body 102-2.

The oxygen supplying step S18 according to the second embodiment is the same as the oxygen supplying step S18 according to the first embodiment, except that the target of the process is changed from the body 100-1 to the body 100-2, as illustrated in the upper left and the upper right diagrams in FIG. 13. Therefore, in the oxygen containing body 101-1, the oxygen containing body 101-2 acquired as a result of applying the oxygen supplying step S18 according to the second embodiment to the body 100-2 is modified such that the zirconia-sol containing layer 24-1 including the zirconia sol interface layer 26 and the alumina slurry coating layer 27 is replaced with the zirconia-sol containing layer 24-2 including the zirconia-sol containing alumina slurry coating layer 28.

The inert-firing step S20 according to the second embodiment is the same as the inert-firing step S20 according to the first embodiment, except that the target of the process is changed from the oxygen containing body 101-1 to the oxygen containing body 101-2, as illustrated in the upper right and the lower left diagrams in FIG. 13. Therefore, at the inert-firing step S20 according to the second embodiment, as the heating at the given second temperature takes place while the zirconia-sol containing alumina slurry coating layer 28 is in contact with the oxygen-containing polymer 31 that is going through a process of being modified and turned into the matrix 32, the alumina slurry component of the zirconia-sol containing alumina slurry coating layer 28 is incorporated into the oxygen-containing polymer 31, which is going through a process of being turned into the matrix 32, and merged into the matrix 32.

Furthermore, at the inert-firing step S20 according to the second embodiment, as the heating takes place, the zirconia sol component of the zirconia-sol containing alumina slurry coating layer 28 is turned into zirconia, and the zirconia becomes diffused into the oxygen-containing polymer 31 that is going through a process of being turned into the matrix 32. With this configuration, the zirconia sol in the matrix 32 forms a zirconia-containing layer 25-2 that contains zirconia in a facing area on the side of the interface layer 23 (an area to be turned into the vacancy-facing area after the oxygen-firing step S22), and in which the zirconia is dispersed from the facing area on the side of the interface layer 23. The zirconia that is based on the zirconia sol component of the zirconia-sol containing alumina slurry coating layer 28 may be widely dispersed across the matrix 32 or completely dispersed across the matrix 32, through the inert-firing step S20 or the oxygen-firing step S22, which will be described later, and thus the boundary between the zirconia-containing layer 25-2 and the zirconia-containing matrix may be obscure. In either case, at least the facing area on the side of the interface layer 23 becomes a state that the zirconia-containing layer 25-2 containing zirconia and where the zirconia is dispersed.

In the manner described above, through the inert-firing step S20 according to the second embodiment, the zirconia-containing layer 25-2 is formed based on the zirconia-sol containing layer 24-2 that includes the zirconia-sol containing alumina slurry coating layer 28, as illustrated in the upper right and the lower left diagrams in FIG. 13. Therefore, the inert-fired body 102-2 acquired as a result of applying the oxygen supplying step S18 according to the second embodiment to the oxygen containing body 101-2 is modified such that the zirconia-containing layer 25-1 is replaced with the zirconia-containing layer 25-2 in the inert-fired body 102-1.

The oxygen-firing step S22 according to the second embodiment is the same as the oxygen-firing step S22 according to the first embodiment, except that the target of the process is changed from the inert-fired body 102-1 to the inert-fired body 102-2, as illustrated in the lower left and the lower right diagrams in FIG. 13. Specifically, the fiber layer 10-2 making up the body 100-2 is turned into a fiber layer 11-2 including the fabric 20 (the fiber bundle 21 and the fiber 22), the vacancy 33, the zirconia-containing layer 25-2, and the matrix 32, Therefore, the ceramic matrix composite 103-2 acquired as a result of applying the oxygen-firing step S22 according to the second embodiment to the inert-fired body 102-2 is modified such that the zirconia-containing layer 25-1 is replaced with the zirconia-containing layer 25-2 in the ceramic matrix composite 103-1.

The ceramic matrix composite 103-2 is, as illustrated in the lower right diagram in FIG. 13, modified such that the zirconia-containing layer 25-1 is replaced with the zirconia-containing layer 25-2 in the ceramic matrix composite 103-1. Furthermore, the zirconia-containing layer 25-2 in the ceramic matrix composite 103-2 has zirconia dispersed from the vacancy-facing area, as illustrated in the lower right diagram in FIG. 13.

Because the ceramic matrix composite 103-2 includes such a zirconia-containing layer 25-2, the strength reduction under a thermal exposure is suppressed.

The method for manufacturing the ceramic matrix composite 103-2 according to the second embodiment is configured in the manner described above. Therefore, except for the functions and the effects achieved by performing the zirconia-sol containing layer forming step S13 according to the first embodiment, that is, except for the functions and the effects achieved by performing the zirconia sol interface layer forming step S13-1 and the alumina slurry coating step S13-2, the functions and the effects that are same as those achieved by the method for manufacturing the ceramic matrix composite 103-1 according to the first embodiment are achieved. Furthermore, the ceramic matrix composite 103-2 according to the second embodiment achieves the functions and the effects that are same as those achieved by the ceramic matrix composite 103-1 according to the first embodiment, except for the functions and the effects resultant of including the zirconia-containing layer 25-1 that is based on the zirconia sol interface layer 26.

Furthermore, in the method for manufacturing the ceramic matrix composite 103-2 according to the second embodiment, the zirconia-sol containing layer forming step S13 includes the zirconia-sol containing alumina slurry coating step S13-3 for forming the zirconia-sol containing alumina slurry coating layer 28 that is an alumina slurry coating layer that contains zirconia sol, by applying alumina slurry that contains zirconia sol, to the fabric 20. Therefore, with the method for manufacturing the ceramic matrix composite 103-2 according to the second embodiment, it is possible to form the zirconia-sol containing alumina slurry coating layer 28 on the side of the interface layer 23, as the zirconia-sol containing layer 24-2, and, as a result, to form the zirconia-containing layer 25-2 in the vacancy-facing area, based on the zirconia-sol containing layer 24-2. Hence, it is possible to suppress the strength reduction of the ceramic matrix composite 103-2 under a thermal exposure, preferably.

Furthermore, in the ceramic matrix composite 103-2 according to the second embodiment, the zirconia-containing layer 25-2 includes zirconia dispersed from the vacancy-facing area. Therefore, the ceramic matrix composite 103-2 according to the second embodiment becomes the ceramic matrix composite 103-2 in which the strength reduction under a thermal exposure is suppressed, preferably, with the presence of the zirconia-containing layer 25-2.

Third Embodiment

Figure 14:
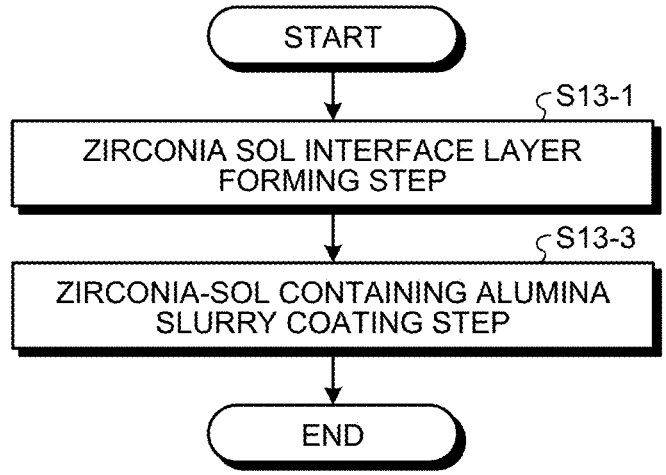
FIG. 14 is a flowchart illustrating the details of a zirconia-sol containing layer forming step according to a third embodiment.

FIG. 14 is a flowchart illustrating the details of the zirconia-sol containing layer forming step S13 according to the third embodiment. A method for manufacturing a ceramic matrix composite 103-3 according to the third embodiment is the method for manufacturing the ceramic matrix composite 103-1 and the method for manufacturing the ceramic matrix composite 103-2 according to the third embodiment, but with the zirconia-sol containing layer forming step S13 modified. The other configurations of the method for manufacturing the ceramic matrix composite 103-3 according to the third embodiment are the same as those of the method for manufacturing the ceramic matrix composite 103-1 according to the first embodiment and the method for manufacturing the ceramic matrix composite 103-2 according to the second embodiment. In the explanations of the method for manufacturing the ceramic matrix composite 103-3 and the ceramic matrix composite 103-3 according to the third embodiment, the configurations that are the same as those in the method for manufacturing the ceramic matrix composite 103-1 and the ceramic matrix composite 103-1 according to the first embodiment, and those in the method for manufacturing the ceramic matrix composite 103-2 and the ceramic matrix composite 103-2 according to the second embodiment are given the same reference signs as those in the first and the second embodiments, and detailed explanations thereof will be omitted.

Figure 15:
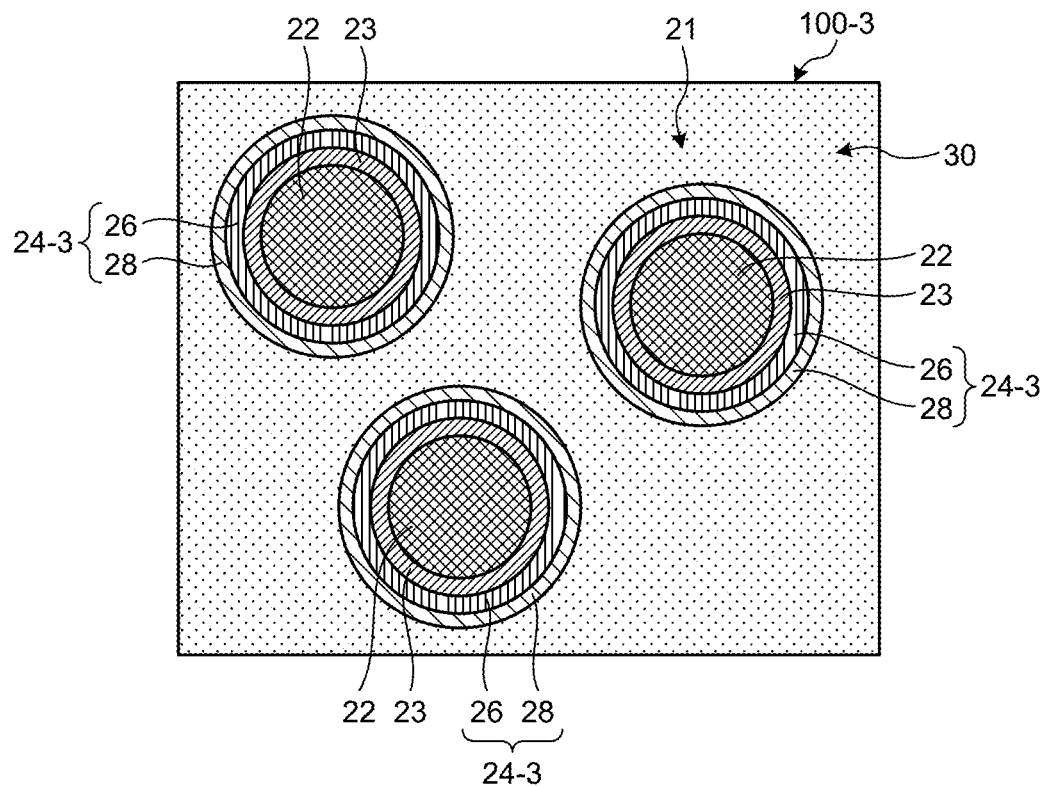
FIG. 15 is an explanatory diagram for explaining the details of a process from a cutting step to an impregnating step according to the third embodiment.

FIG. 15 is an explanatory diagram for explaining the details of a process from the cutting step S10 to the impregnating step S16 according to the third embodiment. FIG. 15 illustrates a body 100-3 from which the ceramic matrix composite 103-3 according to the second embodiment is made. The body 100-3 is formed through the process from the cutting step S10 to the impregnating step S16, performed by the body forming device 2 according to the third embodiment. The following explains the details of process from the cutting step S10 to the impregnating step S16 according to the third embodiment with reference to FIGS. 14 and 15.

As illustrated in FIG. 15, the zirconia-sol containing layer forming step S13 according to the third embodiment is a step of forming a zirconia-sol containing layer 24-3 that contains zirconia sol on the periphery of the ceramic-made fibers 22 included in the fabric 20, in which the interface layer 23 covering the periphery has been formed, as illustrated in FIG. 14, and includes the zirconia sol interface layer forming step S13-1 and the zirconia-sol containing alumina slurry coating step S13-3.

As illustrated in FIG. 15, the zirconia-sol containing alumina slurry coating step S13-3 according to the third embodiment is a step of causing the body forming device 2 to form the zirconia-sol containing alumina slurry coating layer 28 that is an alumina slurry coating layer containing zirconia sol, by applying alumina slurry containing zirconia sol to the fabric 20, on which the interface layer 23 and the zirconia sol interface layer 26 has been formed at the interface layer forming step S12. The zirconia-sol containing alumina slurry coating step S13-3 according to the third embodiment is the same as the zirconia-sol containing alumina slurry coating step S13-3 according to the second embodiment, except that the zirconia-sol containing alumina slurry coating layer 28 is formed on the periphery of the zirconia sol interface layer 26.

In other words, the zirconia-sol containing layer forming step S13 according to the third embodiment is a step of performing the zirconia-sol containing alumina slurry coating step S13-3, instead of the alumina slurry coating step S13-2 in the zirconia-sol containing layer forming step S13 according to the first embodiment, and is a step of forming the zirconia-sol containing layer 24-3 including the zirconia sol interface layer 26 and the zirconia-sol containing alumina slurry coating layer 28, instead of the zirconia-sol containing layer 24-1 including the zirconia sol interface layer 26 and the alumina slurry coating layer 27 according to the first embodiment.

Therefore, in the body 100-1 according to the first embodiment, the body 100-3 according to the third embodiment is modified such that the zirconia-sol containing layer 24-1 including the zirconia sol interface layer 26 and the alumina slurry coating layer 27 is replaced with the zirconia-sol containing layer 24-3 including the zirconia sol interface layer 26 and the zirconia-sol containing alumina slurry coating layer 28.

Figure 16:
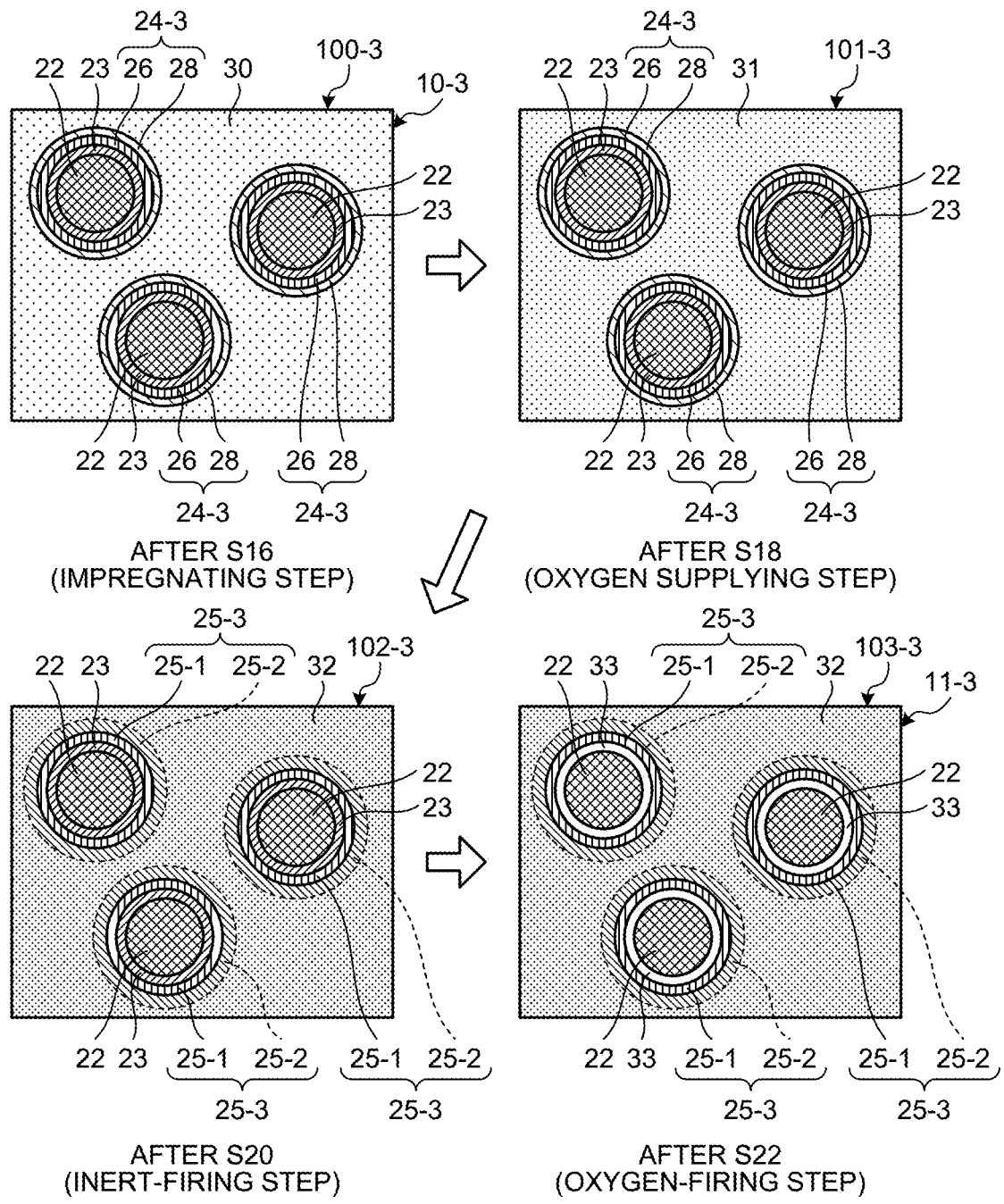
FIG. 16 is an explanatory diagram for explaining the details of a process from an oxygen supplying step to an oxygen-firing step according to the third embodiment.

FIG. 16 is an explanatory diagram for explaining the details of a process from the oxygen supplying step S18 to the oxygen-firing step S22 according to the second embodiment. The following explains the details of process from the oxygen supplying step S18 to the oxygen-firing step S22 according to the third embodiment with reference to FIG. 16. The four diagrams included in FIG. 16 are all sectional views of the structure. The upper left diagram in FIG. 16 illustrates the body 100-3, which is a laminated body of the fiber layers 10-3 including the fabric 20 and the polymer 30, formed through each process from the cutting step S10 to the impregnating step S16 as in the first embodiment. The upper right diagram in FIG. 16 illustrates an oxygen containing body 101-3 as a result of applying the oxygen supplying step S18 to the body 100-3. The lower left diagram in FIG. 16 illustrates an inert-fired body 102-3 as a result of applying the inert-firing step S20 to the oxygen containing body 101-3, and the lower right diagram in FIG. 16 illustrates a ceramic matrix composite 103-3 as a result of applying the oxygen-firing step S22 to the inert-fired body 102-3.

The oxygen supplying step S18 according to the third embodiment is the same as the oxygen supplying step S18 according to the first embodiment, except that the target of the process is changed from the body 100-1 to the body 100-3, as illustrated in the upper left and the upper right diagrams in FIG. 16. Therefore, the oxygen containing body 101-1, the oxygen containing body 101-3 acquired as a result of applying the oxygen supplying step S18 according to the third embodiment to the body 100-3 is modified such that the zirconia-sol containing layer 24-1 including the zirconia sol interface layer 26 and the alumina slurry coating layer 27 is replaced with the zirconia-sol containing layer 24-3 including the zirconia sol interface layer 26 and the zirconia-sol containing alumina slurry coating layer 28.

The inert-firing step S20 according to the third embodiment is the same as the inert-firing step S20 according to the first embodiment, except that the target of the process is changed from the oxygen containing body 101-1 to the oxygen containing body 101-3 as illustrated in the upper right and the lower left diagrams in FIG. 16. Therefore, at the inert-firing step S20 according to the third embodiment, the zirconia sol interface layer 26 included in the zirconia-sol containing layer 24-3 is turned into the zirconia-containing layer 25-1 containing sintered zirconia, in the same manner as at the inert-firing step S20 according to the first embodiment. Furthermore, at the inert-firing step S20 according to the third embodiment, the alumina slurry component of the zirconia-sol containing alumina slurry coating layer 28 is incorporated into the oxygen-containing polymer 31 going through a process of being turned into the matrix 32, and merged into the matrix 32, in the same manner as at the inert-firing step S20 according to the second embodiment.

Furthermore, at the inert-firing step S20 according to the third embodiment, the zirconia sol component of the zirconia-sol containing alumina slurry coating layer 28 is turned into zirconia, and the zirconia becomes diffused toward the oxygen-containing polymer 31 that is going to be turned into the matrix 32, in the same manner as at the inert-firing step S20 according to the second embodiment. With this, the zirconia sol in the matrix 32 forms the zirconia-containing layer 25-2 that contains zirconia in a facing area on the side of the interface layer 23 (an area to be turned into the vacancy-facing area after the oxygen-firing step S22), and in which the zirconia is dispersed from the facing area on the side of the interface layer 23.

In the manner described above, through the inert-firing step S20 according to the third embodiment, as illustrated in the upper right and the lower left diagrams in FIG. 13, because the zirconia-containing layer 25-1 is formed based on the zirconia sol interface layer 26 included in the zirconia-sol containing layer 24-3, and the zirconia-containing layer 25-2 is formed based on the zirconia-sol containing alumina slurry coating layer 28 included in the zirconia-sol containing layer 24-3, a zirconia-containing layer 25-3 including the zirconia-containing layer 25-1 and the zirconia-containing layer 25-2 is formed based on the zirconia-sol containing layer 24-3. In other words, the inert-fired body 102-3 acquired as a result of applying the inert-firing step S20 according to the third embodiment to the oxygen containing body 101-3 is modified such that the zirconia-containing layer 25-1 is replaced with the zirconia-containing layer 25-3 including the zirconia-containing layer 25-1 and the zirconia-containing layer 25-2 in the inert-fired body 102-1.

The oxygen-firing step S22 according to the third embodiment is the same as the oxygen-firing step S22 according to the first embodiment, except that the target of the process is changed from the inert-fired body 102-1 to the inert-fired body 102-3, as illustrated in the lower left and the lower right diagrams in FIG. 16. Specifically, the fiber layer 10-3 making up the body 100-3 is turned into a fiber layer 11-3 including the fabric 20 (the fiber bundle 21 and the fiber 22), the vacancy 33, the zirconia-containing layer 25-3, and the matrix 32, Therefore, the ceramic matrix composite 103-3 acquired as a result of applying the oxygen-firing step S22 according to the third embodiment to the inert-fired body 102-3 is modified such that the zirconia-containing layer 25-1 is replaced with the zirconia-containing layer 25-3 including the zirconia-containing layer 25-1 and the zirconia-containing layer 25-2 in the ceramic matrix composite 103-1.

As illustrated in the lower right diagram in FIG. 16, the ceramic matrix composite 103-3 is modified such that the zirconia-containing layer 25-1 is replaced with the zirconia-containing layer 25-3 including the zirconia-containing layer 25-1 and the zirconia-containing layer 25-2 in the ceramic matrix composite 103-1. The zirconia-containing layer 25-1 included in the ceramic matrix composite 103-3 is the same as the zirconia-containing layer 25-1 according to the first embodiment, and the zirconia-containing layer 25-2 included in the ceramic matrix composite 103-3 is the same as the zirconia-containing layer 25-2 according to the second embodiment.

The ceramic matrix composite 103-1 includes such a zirconia-containing layer 25-3. Therefore, the presence of the zirconia-containing layer 25-1 and the presence of the zirconia-containing layer 25-2 make it possible to suppress the strength reduction under a thermal exposure further.

The method for manufacturing the ceramic matrix composite 103-2 according to the third embodiment is configured in the manner described above. Therefore, including the functions and the effects achieved by performing the zirconia sol interface layer forming step S13-1 according to the first embodiment and the functions and the effects achieved by performing the zirconia-sol containing alumina slurry coating step S13-3 according to the second embodiment, the same functions and the effects as those achieved by the method for manufacturing the ceramic matrix composite 103-1 according to the first embodiment and the method for manufacturing the ceramic matrix composite 103-2 according to the second embodiment are achieved. Furthermore, the ceramic matrix composite 103-3 according to the third embodiment achieves the same functions and the effects achieved by the ceramic matrix composite 103-1 according to the first embodiment and the ceramic matrix composite 103-2 according to the second embodiment, including the functions and the effects resultant of including the zirconia-containing layer 25-1 that is based on the zirconia sol interface layer 26, and the functions and the effects resultant of including the zirconia-containing layer 25-2 that is based on the zirconia-sol containing alumina slurry coating layer 28.

In other words, in the method for manufacturing the ceramic matrix composite 103-3 according to the third embodiment, the zirconia-sol containing layer forming step S13 includes, the zirconia-sol containing layer forming step S13 includes the zirconia sol interface layer forming step S13-1 for forming the zirconia sol interface layer 26 covering the periphery of the interface layer 23, and the zirconia-sol containing alumina slurry coating step S13-3 for forming the zirconia-sol containing alumina slurry coating layer 28 that is an alumina slurry coating layer containing zirconia sol, by applying alumina slurry containing zirconia sol to the fabric 20. Therefore, the method for manufacturing the ceramic matrix composite 103-3 according to the third embodiment can form the zirconia sol interface layer 26 and the zirconia-sol containing alumina slurry coating layer 28, in the order listed herein from the side of the interface layer 23, as the zirconia-sol containing layer 24-3, and therefore enables the zirconia-containing layer 25-3 that is based on the zirconia-sol containing layer 24-3 to be formed in the vacancy-facing area. Therefore, it is possible to suppress the strength reduction of the ceramic matrix composite 103-3 under a thermal exposure more preferably.

Furthermore, the ceramic matrix composite 103-3 according to the third embodiment has the zirconia-containing layer 25-3 where a part of zirconia resides at a high density in the vacancy-facing area, and another part of the remaining zirconia is dispersed from the vacancy-facing area. Therefore, in the ceramic matrix composite 103-3 according to the third embodiment, such a part of the zirconia sol prevents disappearance of the vacancy 33, and the presence of the zirconia-containing layer 25-3 including the zirconia-containing layer 25-1 and the zirconia-containing layer 25-2 makes it possible to achieve the ceramic matrix composite 103-3 in which the strength reduction under a thermal exposure is suppressed even further, more preferably.

EXAMPLE

The present invention will now be explained more in detail based on one example implemented to clarify the effects of the present invention. The example explained below is, however, not intended to limit the scope of the present invention in any way.

FIG. 17 is a diagram illustrating the example pertinent to the embodiments according to the present invention. In the present example, five different experiments, Experiment 1 to Experiment 5, were carried out. In FIG. 17, conditions used in each experiment and evaluation results related to the strength reduction of the ceramic matrix composite are summarized for the five experiments from Experiment 1 to Experiment 5. In FIG. 17, "absent" is indicated in a cell corresponding to a layer not provided to the ceramic matrix composite subjected each experiment, and a first zirconia content percentage [unit; mass %] or a second zirconia content percentage [unit; mass %] is indicated for a layer provided to the ceramic matrix composite subjected each experiment. In FIG. 17, a tensile strength retention ratio [unit; %] is also indicated in the column of the tensile strength retention ratio.

Experiment 1

As Experiment 1, a ceramic matrix composite was manufactured using the system 1 for manufacturing a ceramic matrix composite described above, without performing the zirconia-sol containing layer forming step S13 according to the first to the third embodiments, that is, without forming the zirconia-sol containing layer 24-1, 24-2, 24-3, but only performing each process, that is, the cutting step S10, the interface layer forming step S12, the laminating step S14, the impregnating step S16, the oxygen supplying step S18, the inert-firing step S20, and the oxygen-firing step S22, which are the other processes described above. In Experiment 1, the fabric 20 made from the fiber bundles 21 including the fibers 22 with a cross-sectional diameter of approximately 10 μm was used.

In Experiment 1, the tensile strength retention ratio related to the ceramic matrix composite was evaluated. The tensile strength retention ratio is a ratio [unit; %] of the tensile strength of the ceramic matrix composite at the ordinary temperature, after being subjected to a thermal exposure in a condition of an exposure to the air of 1200 degrees for 4 hours, with respect to the tensile strength thereof at the ordinary temperature before the thermal exposure. At this time, the tensile strength was measured using a tensile testing method according to Japan Industrial Standard JIS R 1606-1995, and was obtained as a tensile strength [unit; Pa] that is the maximum tensile stress that the test piece experiences during the tensile test. In the Experiment 1, a tensile strength retention ratio of 59% was obtained as the evaluation result.

Experiment 2

As Experiment 2, the ceramic matrix composite 103-1 according to the first embodiment was manufactured by additionally performing the zirconia-sol containing layer forming step S13 according to the first embodiment, between the interface layer forming step S12 and the laminating step S14 in Experiment 1 to form the zirconia-sol containing layer 24-1. In Experiment 2, at the zirconia sol interface layer forming step S13-1 in the zirconia-sol containing layer forming step S13, zirconia sol that is chlorine-free water-based sol containing zirconia powder having a particle diameter of 1 μm or so, and having a first zirconia content percentage of 5% by mass was used. In Experiment 2, the other conditions that were the same as those in Experiment 1 were used. In Experiment 2, a test piece having a shape and a size that were the same as those in Experiment 1 was created, and the tensile strength retention ratio was evaluated using the same method as that used in Experiment 1. In Experiment 2, a tensile strength retention ratio of 78% was obtained as the evaluation result.

Experiment 3

As Experiment 3, the ceramic matrix composite 103-2 according to the second embodiment was manufactured by additionally performing the zirconia-sol containing layer forming step S13 according to the second embodiment, between the interface layer forming step S12 and the laminating step S14 in Experiment 1, to form the zirconia-sol containing layer 24-2. In Experiment 3, at the zirconia-sol containing alumina slurry coating step S13-3 included in the zirconia-sol containing layer forming step S13, alumina slurry containing zirconia sol that was chlorine-free water-based sol containing zirconia powder having a particle diameter of 1 μm or so and a second zirconia content percentage of 1% by mass was used. In Experiment 3, the other conditions that were the same as those in Experiment 1 were used. In Experiment 3, a test piece having a shape and a size that are the same as those in Experiment 1 was created, and the tensile strength retention ratio was evaluated using the same method as that used in Experiment 1. In Experiment 3, a tensile strength retention ratio of 90% was obtained as the evaluation result.

Experiment 4

As Experiment 4, the alumina slurry used at the zirconia-sol containing alumina slurry coating step S13-3 included in the zirconia-sol containing layer forming step S13 in Experiment 3 was changed to alumina slurry having a second zirconia content percentage of 3% by mass. In Experiment 4, the other conditions that were the same as those in Experiment 3 were used. In Experiment 4, a test piece having a shape and a size that are the same as those in Experiment 1 was created, and the tensile strength retention ratio was evaluated using the same method as that used in Experiment 1. In Experiment 4, a tensile strength retention ratio of 64% was obtained as the evaluation result.

Experiment 5

As Experiment 5, the ceramic matrix composite 103-3 according to the third embodiment was manufactured, by additionally performing the zirconia-sol containing layer forming step S13 according to the third embodiment, between the interface layer forming step S12 and the laminating step S14 in Experiment 1, to form the zirconia-sol containing layer 24-3. In Experiment 5, at the zirconia sol interface layer forming step S13-1 included in the zirconia-sol containing layer forming step S13, the same zirconia sol as that used in Experiment 2 was used. Furthermore, in Experiment 5, at the zirconia-sol containing alumina slurry coating step S13-3 included in the zirconia-sol containing layer forming step S13, alumina slurry containing the same zirconia sol as that used in Experiment 3 was used. In Experiment 5, the other conditions that were the same as those in Experiment 1 were used. In Experiment 5, a test piece having a shape and a size that are the same as those in Experiment 1 was created, and the tensile strength retention ratio was evaluated using the same method as that used in Experiment 1. In Experiment 5, a tensile strength retention ratio of 104% was obtained as the evaluation result.

Compared with 59%, which is the tensile strength retention ratio in Experiment 1 in which the zirconia-sol containing layer 24-1, 24-2, 24-3 was not formed, the tensile strength retention ratio increased to 78% in Experiment 2 in which the zirconia-sol containing layer 24-1 was formed using the zirconia sol the first zirconia content percentage of which was 5% by mass. With this result, it has become clear that the strength reduction under a thermal exposure was suppressed by forming the zirconia-sol containing layer 24-1.

Compared with 59%, which is the tensile strength retention ratio in Experiment 1 in which the zirconia-sol containing layer 24-1, 24-2, 24-3 was not formed, the tensile strength retention ratio increased to 90% in Experiment 3 in which the zirconia-sol containing layer 24-2 was formed using the alumina slurry having a second zirconia content percentage of 1% by mass, and the tensile strength retention ratio increased to 64% in Experiment 4 in which the zirconia-sol containing layer 24-2 was formed using the alumina slurry having a second zirconia content percentage of 3% by mass. With these results, it has become clear that the strength reduction under a thermal exposure was suppressed by forming the zirconia-sol containing layer 24-2. Furthermore, the tensile strength retention ratio increased even more in Experiment 3 in which the second zirconia content percentage of the alumina slurry from which the zirconia-sol containing layer 24-2 was formed was 1% by mass, compared with that in Experiment 4 in which the second zirconia content percentage was 3% by mass. With this result, it has become clear that that the effect of suppressing the strength reduction under a thermal exposure increased when the second zirconia content percentage of the alumina slurry from which the zirconia-sol containing layer 24-2 is formed was 1% by mass, compared with that achieved with 3% by mass.

Compared with tensile strength retention ratio of 59% in Experiment 1 in which the zirconia-sol containing layer 24-1, 24-2, 24-3 was not formed, the tensile strength retention ratio increased to 104% in Experiment 5 in which the zirconia-sol containing layer 24-3 was formed using zirconia sol having a first zirconia content percentage of 5% by mass, and the alumina slurry having a second zirconia content percentage of 1% by mass. With this result, it has become clear that the strength reduction under a thermal exposure was completely suppressed by forming the zirconia-sol containing layer 24-3.

Some embodiments of the present invention have been explained above, but the embodiments are not limited by the descriptions of the embodiments. Furthermore, the elements described above include those that can be easily thought of by those skilled in the art, those that are substantially the same, and those falling within a scope of what is called equivalency. Furthermore, the elements described above may be combined as appropriate.

Furthermore, any these elements may be omitted, replaced, or modified within the scope not deviating from the spirit of the embodiments described above.

REFERENCE SIGNS LIST

1 manufacturing system
10-1, 11-1 fiber layer
20 fabric
21 fiber bundle
22 fiber
23 interface layer
24-1, 24-2, 24-3 zirconia-sol containing layer
25-1, 25-2, 25-3 zirconia-containing layer
26 zirconia sol interface layer
27 alumina slurry coating layer
28 zirconia-sol containing alumina slurry coating layer
30 polymer
31 oxygen-containing polymer
32 matrix
33 vacancy
100-1, 100-2, 100-3 body
101-1, 101-2, 101-3 oxygen containing body
102-1, 102-2, 102-3 inert-fired body
103-1, 103-2, 103-3 ceramic matrix composite

The invention claimed is:

1. A ceramic matrix composite manufacturing method comprising:
   forming a zirconia-sol containing layer that contains zirconia sol, on fabric having an interface layer formed on a periphery of each of a plurality of ceramic-made fibers;
   impregnating the fabric having the zirconia-sol containing layer formed, with a polymer as a precursor, to form a body;
   supplying oxygen to the polymer included in the body;
   heating the body in an inert gas atmosphere to cause a reaction of the polymer to form a matrix; and
   heating the body in an oxygen atmosphere to remove the interface layer so that a vacancy is formed between the fibers and the matrix and a zirconia-containing layer is formed in vacancy-facing area by a given thickness from a surface of the matrix facing the vacancy, after supplying the oxygen and heating the body in the inert gas atmosphere, to generate a ceramic matrix composite in which the matrix is interposed between the fibers.

2. The ceramic matrix composite manufacturing method according to claim 1, wherein
   forming the zirconia-sol containing layer includes
      forming a zirconia sol interface layer covering a periphery of the interface layer; and
      applying alumina slurry to the fabric having the zirconia sol interface layer formed, to form an alumina slurry coating layer.

3. The ceramic matrix composite manufacturing method according to claim 1, wherein forming the zirconia-sol containing layer includes applying alumina slurry that contains the zirconia sol to the fabric, to form an alumina slurry coating layer that contains the zirconia sol.

4. The ceramic matrix composite manufacturing method according to claim 1, wherein
   forming the zirconia-sol containing layer includes
      forming a zirconia sol interface layer that covers a periphery of the interface layer; and
      applying alumina slurry that contains the zirconia sol to the fabric, to form an alumina slurry coating layer that contains the zirconia sol.

5. The ceramic matrix composite manufacturing method according to claim 1, wherein heating the body in the inert gas atmosphere is performed after supplying the oxygen.

6. The ceramic matrix composite manufacturing method according to claim 1, wherein
supplying the oxygen includes supplying oxygen to the polymer by heating the body in an oxygen atmosphere, and
a heating temperature of the body used at supplying the oxygen is lower than heating temperatures used at heating the body in the inert gas atmosphere and heating the body in the oxygen atmosphere.

7. The ceramic matrix composite manufacturing method according to claim 6, wherein the heating temperature of the body used at supplying the oxygen is equal to or higher than 200 degrees Celsius and lower than 600 degrees Celsius.

8. The ceramic matrix composite manufacturing method according to claim 1, wherein
supplying the oxygen includes supplying oxygen to the polymer by keeping the body in a water vapor atmosphere, and
a temperature of the water vapor used at supplying the oxygen is lower than a heating temperature used at heating the body in the inert gas atmosphere and heating the body in the oxygen atmosphere.

9. The ceramic matrix composite manufacturing method according to claim 8, wherein a temperature of the water vapor used at supplying the oxygen is equal to or higher than 80 degrees Celsius and lower than 200 degrees Celsius.

10. The ceramic matrix composite manufacturing method according to claim 1, wherein the polymer contains a ceramic made of a same material as that of the fibers.

11. The ceramic matrix composite manufacturing method according to claim 1, wherein the interface layer is a layer including carbon as a main component.

* * * * *